US008619301B2

(12) United States Patent
Morita

(10) Patent No.: US 8,619,301 B2
(45) Date of Patent: Dec. 31, 2013

(54) IMAGE FORMING APPARATUS WITH INFORMING FUNCTION

(75) Inventor: Keisuke Morita, Hachioji (JP)

(73) Assignee: Konica Minolta Business Technologies Inc., Tokyo (JP)

( * ) Notice: Subject to any disclaimer, the term of this patent is extended or adjusted under 35 U.S.C. 154(b) by 25 days.

(21) Appl. No.: 13/095,061

(22) Filed: Apr. 27, 2011

(65) Prior Publication Data

US 2011/0267650 A1 Nov. 3, 2011

(30) Foreign Application Priority Data

Apr. 30, 2010 (JP) ................................. 2010-104681

(51) Int. Cl.
*G06F 3/12* (2006.01)
(52) U.S. Cl.
USPC ............................ 358/1.15; 358/1.9; 358/3.24
(58) Field of Classification Search
USPC ................................................ 358/1.1–3.29
See application file for complete search history.

(56) References Cited

U.S. PATENT DOCUMENTS

| | | | |
|---|---|---|---|
| 2008/0246989 A1 | 10/2008 | Konuma | |
| 2009/0273802 A1* | 11/2009 | Kajiyama | ..................... 358/1.15 |
| 2010/0002251 A1* | 1/2010 | Tachibana | ..................... 358/1.15 |

FOREIGN PATENT DOCUMENTS

| | | | |
|---|---|---|---|
| JP | 2001-130083 A | 5/2001 |
| JP | 2003-032404 A | 1/2003 |
| JP | 2004-118277 A | 4/2004 |
| JP | 2004-282439 A | 10/2004 |
| JP | 2008-259040 A | 10/2008 |
| JP | 2009-303000 A | 12/2009 |

OTHER PUBLICATIONS

Chinese Office Action dated Sep. 2, 2013 (and English translation thereof) in counterpart Chinese Application No. 201110110432.4.
Japanese Office Action dated Jul. 23, 2013 (and English translation thereof) issued in Japanese Application No. 2010-104681.

* cited by examiner

*Primary Examiner* — Benny Q Tieu
*Assistant Examiner* — Marcellus Augustin
(74) *Attorney, Agent, or Firm* — Holtz, Holtz, Goodman & Chick, P.C.

(57) ABSTRACT

An image forming apparatus forms an image on a recording medium to output the image based on a print job, and the image forming apparatus includes: a control section which controls an output operation performed by the image forming apparatus; and an informing section; wherein the control section causes the informing section to inform output content confirmation information for confirming one or more contents each being of an image output operation corresponding to the print job and one or more contents each being of a predetermined output operation set in the image forming apparatus, based on the print job and a setting content of the predetermined output operation set in the image forming apparatus, the setting content being set independently of a setting of the image output operation corresponding to the print job.

6 Claims, 22 Drawing Sheets

SHEET NODE 1
- C1: SHEET NUMBER
- C2: DOCUMENT PAGE NUMBER
- C3: COPY NUMBER
- C4: BLANK OR PRINT
- C5: IMAGE ADDRESS
- C6: SINGLE-SIDE OR DOUBLE-SIDE
- C7: TRAY NUMBER
- C8: ORDINARY SHEET
- ...
- C9: SUBSEQUENT NODE ADDRESS
- C10: PRECEDING NODE ADDRESS:NULL

SHEET NODE 2
- SHEET NUMBER
- DOCUMENT PAGE NUMBER
- COPY NUMBER
- BLANK OR PRINT
- IMAGE ADDRESS
- SINGLE-SIDE OR DOUBLE-SIDE
- TRAY NUMBER
- ORDINARY SHEET
- ...
- SUBSEQUENT NODE ADDRESS
- PRECEDING NODE ADDRESS

SHEET NODE 3
- SHEET NUMBER
- DOCUMENT PAGE NUMBER
- COPY NUMBER
- BLANK OR PRINT
- IMAGE ADDRESS
- SINGLE-SIDE OR DOUBLE-SIDE
- TRAY NUMBER
- ORDINARY SHEET
- ...
- SUBSEQUENT NODE ADDRESS
- PRECEDING NODE ADDRESS

⋯

SHEET NODE N
- SHEET NUMBER
- DOCUMENT PAGE NUMBER
- COPY NUMBER
- BLANK OR PRINT
- IMAGE ADDRESS
- SINGLE-SIDE OR DOUBLE-SIDE
- TRAY NUMBER
- ORDINARY SHEET
- ...
- SUBSEQUENT NODE ADDRESS:NULL
- PRECEDING NODE ADDRESS

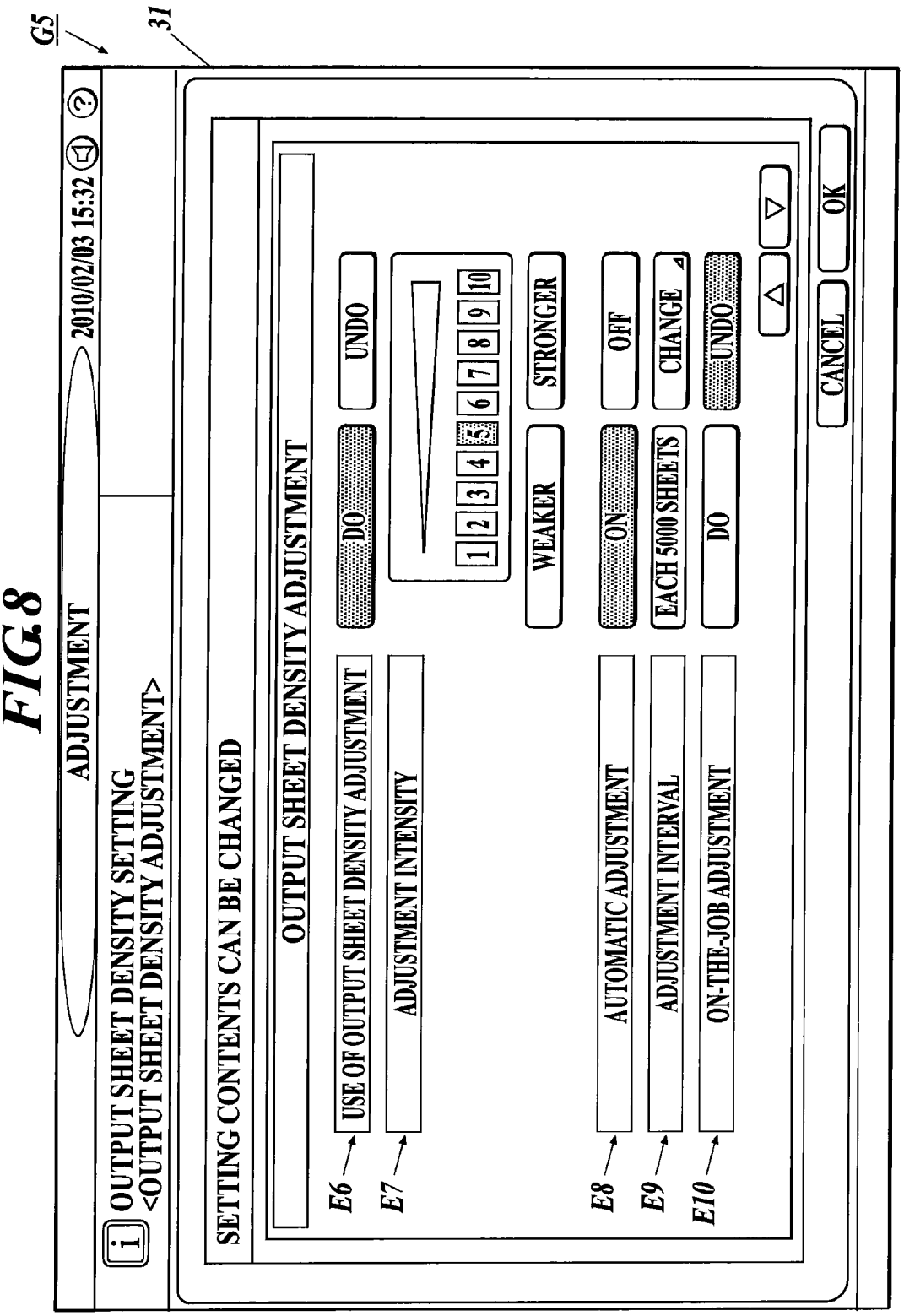

FIG. 9

G6 — TICKET EDIT — 31

| TRAY1 | ▢ | A4 | ppp1 | 62-71g | | TRAY3 | ▢ | A3 | 1ABC | 217-244g | | TRAY6 | ▢ | 11x17W | | | 62-71g |
|---|---|---|---|---|---|---|---|---|---|---|---|---|---|---|---|---|---|
| TRAY2 | ▢ | A4 | PLAIN PAPER | 62-71g | | TRAY4 | ▢ | A5 | 123456 | 217-244g | | TRAY7 | ▢ | 11x17W | ppp1 | 1234567 8 | 217-244g |
| | | | | | | TRAY5 | ▢ | CUSTOM | 123456 | 62-71g | | TRAY8 | ▢ | 11x17W | PB | 72-91g |

SHEET RESERVATION — AUTOMATIC

E11 — NUMBER OF COPIES/PRINT SURFACE

| SET NUMBER OF COPIES | 0001 |
| PRINT SURFACE | SINGLE → SINGLE / SINGLE → DOUBLE / DOUBLE → SINGLE / DOUBLE → DOUBLE |

E12 — DOCUMENT SETTING

| SETTING DIRECTION | UPWARD | DOWNWARD | LEFTWARD | RIGHTWARD |
| MODE SIDE BINDING DIRECTION | RIGHT/LEFT | TOP | | |
| SPECIAL DOCUMENT | NORMAL | MIXTURE | Z-FOLD | ORIGINAL SURFACE REGISTRATION |
| DOCUMENT SIZE | FINITE FORM | INFINITE FORM | INDEX | |

E13 — IMAGE QUALITY SETTING

| DOCUMENT IMAGE QUALITY | CHARACTER/PHOTOGRAPH | THIN CHARACTER | PHOTOGRAPH | CHARACTER |
| DENSITY SETTING | AUTOMATIC DENSITY | -4 | -3 | -2 | -1 | 0 | +1 | +2 | +3 | +4 |
| BASE ADJUSTMENT | NORMAL | -4 | -3 | -2 | -1 | 0 | +1 | +2 | +3 | +4 |
| SHARPNESS | NORMAL | -4 | -3 | -2 | -1 | 0 | +1 | +2 | +3 | +4 |
| CHARACTER/PHOTOGRADE | NORMAL | -4 | -3 | -2 | -1 | 0 | +1 | +2 | +3 | +4 |

E14 — MAGNIFICATION SETTING

| VERTICAL | 1.000 | AUTOMATIC | REDUCTION | SAME | ENLARGED |
| HORIZONTAL | 1.000 | MANUAL | REGISTRATION 1 | REGISTRATION 2 | REGISTRATION 3 |

E15 — OUTPUT CONDITION

| | AUTOMATIC | PROOF | WEIGHT |

E16 — OUTPUT SETTING

| DISCHARGE TRAY | CASE BINDING SUB-TRAY | | | |
| DOUBLE-SIDE BINDING DIRECTION | RIGHT/LEFT | TOP | | |
| DISCHARGE SURFACE/CHANGE DISCHARGE ORDER | FACE DOWN | FACE UP | FORWARD | REVERSE |
| SORT/GROUP | SORT | LOOP | SORTING | |
| STAPLE | | | | |
| SADDLE STITCH | | | | |
| MIDDLE-OVERLAPPING-FOLD | | | | |
| THREE-OVERLAPPING-FOLD | | | | |
| PUNCH HOLE | UNDO | LEFT | RIGHT | TOP |
| FOLD | UNDO | Z-FOLD | INNER THREE-FOLD | OUTER THREE-FOLD | PARALLEL-FOLD | GATEFOLD | INNER FOLD |
| CASE BINDING | UNDO | | | |

APPLICATION SETTING

E17

OK    CANCEL

TICKET EDIT

| TRAY1 | ☐ | 12x18 PLAIN PAPER 62-71g | TRAY3 | ☐ | A4 PLAIN PAPER 62-71g |
| TRAY2 | ☐ | CUSTOM PLAIN PAPER 62-71g | TRAY4 | ☐ | A4 PLAIN PAPER 62-71g |
| | | | TRAY5 | ☐ | CUSTOM PLAIN PAPER 62-71g |

SHEET RESERVATION — AUTOMATIC — 31

E22 — SET SHEET FOR REFERRING TO OUTPUT IMAGE

E23 — SHEET INFORMATION

<OUTPUT SURFACE> : SINGLE-SIDE
<FEEDING TRAY> : TRAY 2
<SHEET SETTING>
SHEET SIZE : CUSTOM
SHEET TYPE : PLAIN PAPER
BASIS WEIGHT : 62-71G
PUNCHING HOLE : NOT AVAILABLE
COLOR : WHITE
INDEX : NOT AVAILABLE
<OUTPUT SETTING>
BINDING DIRECTION : HORIZONTAL BINDING
STAPLE : NOT AVAILABLE
SEPARATION : OFF
PUNCH : NOT AVAILABLE
<COVER SHEET/INSERTION SHEET>

OUTPUT IMAGE

E18

-1-
TEST TEST
TEST TEST
TEST TEST
TEST TEST
TEST TEST
TEST TEST

-2-
TEST TEST
TEST TEST
TEST TEST
TEST TEST
TEST TEST
TEST TEST

SURFACE  BACK FACE — E19

E21 — 000001/000003
E20
⇐ HEAD SHEET
◁ PRECEDING SHEET
▷ SUBSEQUENT SHEET
⇒ FINAL SHEET

SHEET NUMBER ASSIGNMENT

CLOSE

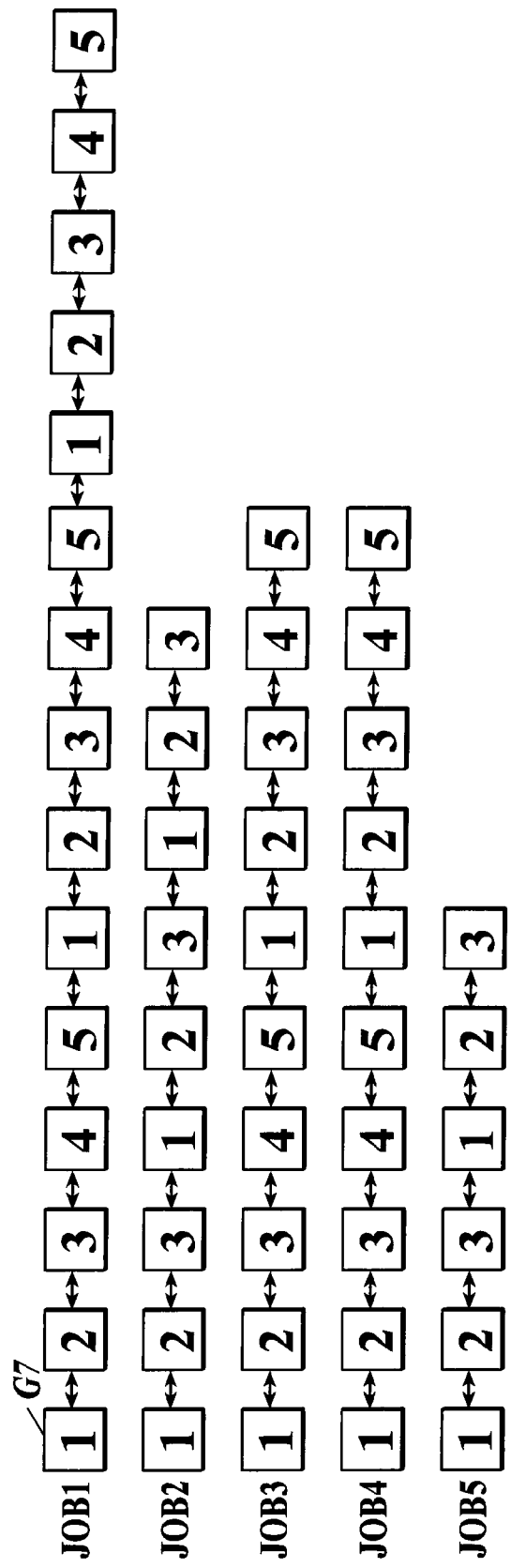

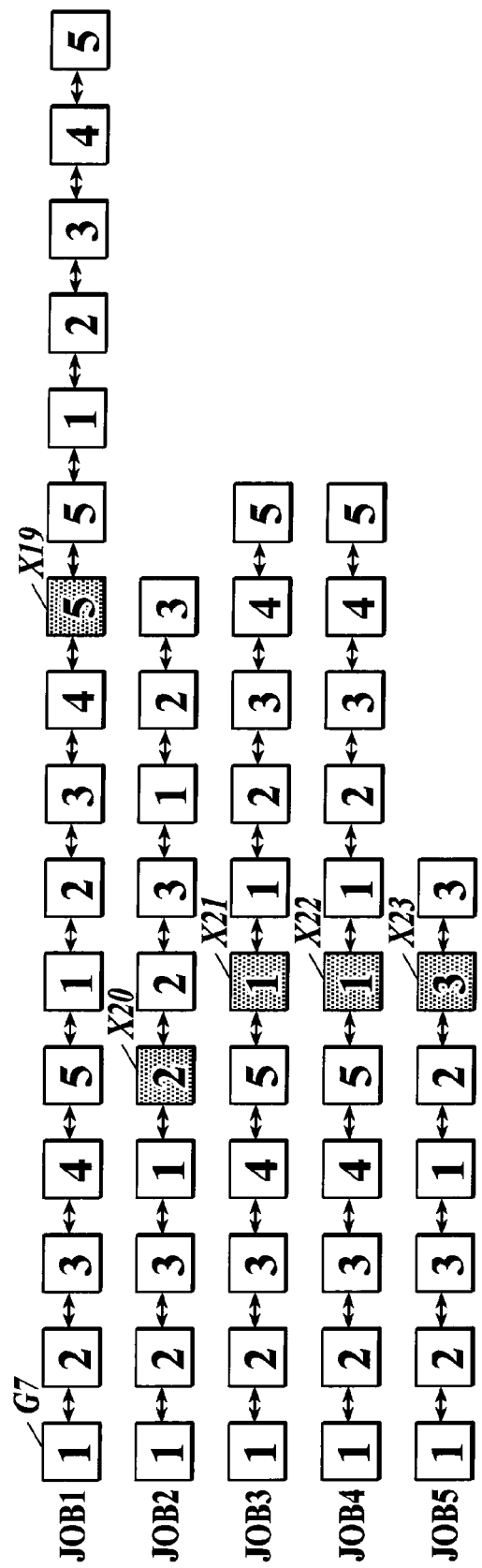

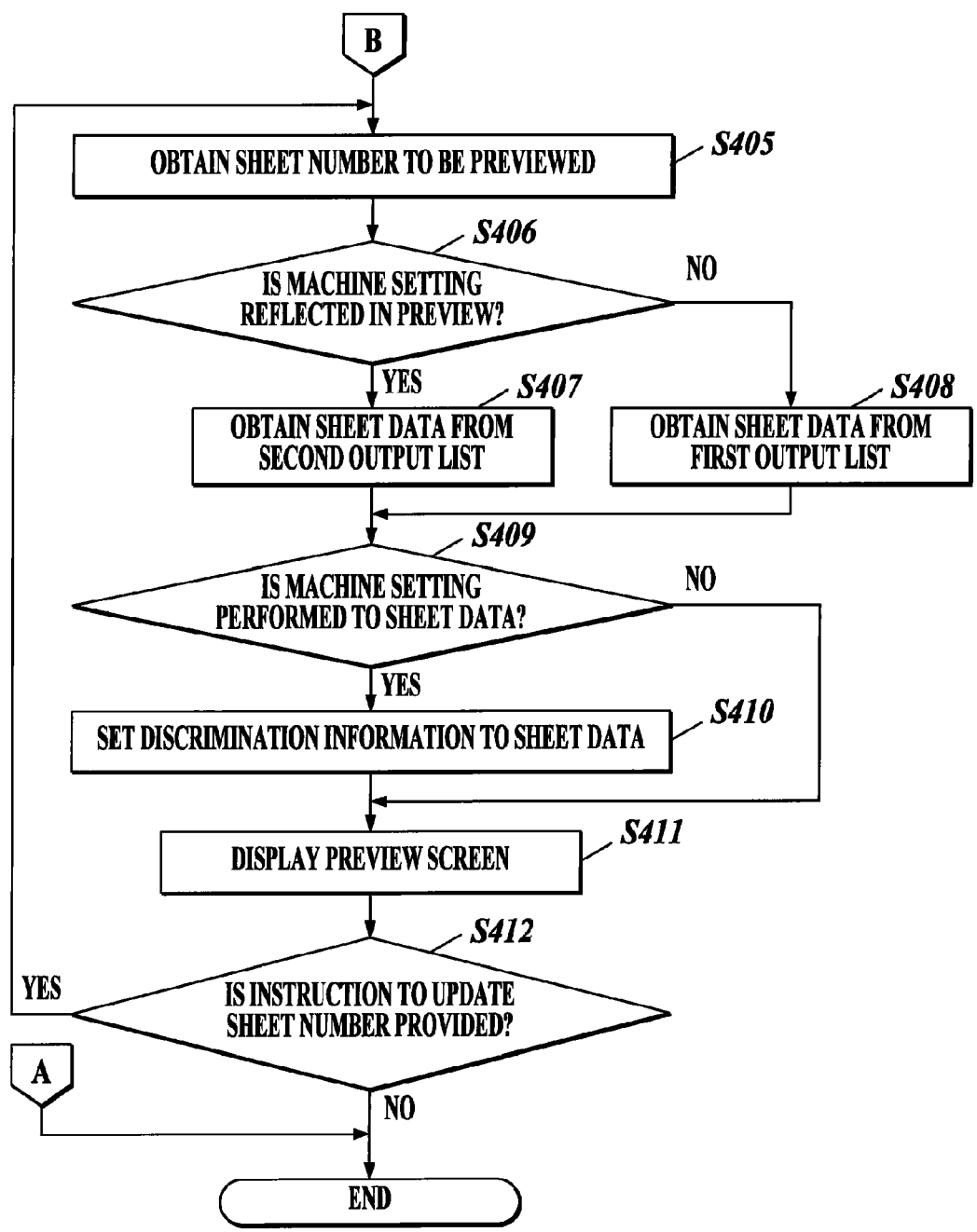

IMAGE FORMING APPARATUS WITH INFORMING FUNCTION

BACKGROUND

1. Field of the Invention

The present invention relates to an image forming apparatus.

2. Description of Related Art

Recently, there is well known an image forming apparatus by which, when performing a print job to form an image of print data, a user can confirm output contents of the print job before image formation by displaying on a screen an image (preview image) of a sheet on which the image is formed.

For example, Japanese Patent Application Laid Open Publication No. 2004-118277 discloses a technique according to which discrimination information is set to each feeding section which feeds a sheet on which the print data is to be printed, an assignment of the feeding section (sheet) by a user is received when producing a preview image of the print data, and the preview image is produced and displayed after the assigned feeding section is specified by utilizing the discrimination information, and thereby it becomes possible to confirm whether or not the print data is printed on the desired sheet prior to the print. By this, for example, the preview image including a state in which a slip sheet is inserted can be produced and displayed by assigning a slip sheet insertion position and the feeding section.

Japanese Patent Application Laid Open Publication No. 2003-32404 discloses a technique according to which previews of a cover page and the print data are controlled based on cover page setting information obtained from temporarily-stored FAX transmission data in an intermediate code format and a cover page preview method selected by the user when previewing the FAX transmission data in which the cover page is added to the print data. By this, even when the cover pages are individually attached to the pieces of FAX transmission data having plural destinations, the user can preview contents of the pieces of FAX transmission data without confusion.

Japanese Patent Application Laid Open Publication No. 2001-130083 discloses a technique according to which intermediate data of the job and an output job setting file are stored in a spool file when an instruction to store the job is provided during the print, and the print image of the job is previewed by a previewer when a user selects the stored job. By this, for example, a print setting such as bookbinding print and a cover sheet insertion is assigned, the preview in which the print setting is reflected can be performed.

Japanese Patent Application Laid Open Publication No. 2004-282439 discloses a technique according to which a read document or a virtual document can be displayed as a preview image in a preview screen, and a simple edit of the image and the setting of finishing processing can be performed using a touch panel or a mouse while being reflected in the displayed preview image. By this, it becomes possible to display the preview image in which the image edit such as movement, enlargement and reduction, and rotation of the image, and position setting of the finishing processing such as stapling and punching are reflected.

Thus, according to the conventional image forming apparatus, the preview in which the job setting set to each print job is reflected can be performed when previewing the print data.

However, even by using the techniques disclosed in Japanese Patent Application Laid Open Publication Nos. 2004-118277, 2003-32404, 2001-130083, and 2004-282439, contents of various output operations, such as a partition sheet insertion function, a sample sheet discharge function, and an automatic density adjustment sheet insertion function, which are set in the image forming apparatus itself independently of the job setting, cannot be previewed. Therefore, when a change or a setting mistake occurs in contents of a predetermined output operation set in the image forming apparatus, there is a possibility that a printing error which possibly occurs subsequent to the change or setting mistake cannot previously be confirmed.

Incidentally, even if the printing error is generated, the printing error can be corrected in a subsequent process. However, correction work becomes troublesome and usability is not good.

SUMMARY

In order to solve at least one of the abovementioned problems, according to one aspect of the present invention, there is provided an image forming apparatus which forms an image on a recording medium to output the image based on a print job, the image forming apparatus including: a control section which controls an output operation performed by the image forming apparatus; and an informing section; wherein the control section causes the informing section to inform output content confirmation information for confirming one or more contents each being of an image output operation corresponding to the print job and one or more contents each being of a predetermined output operation set in the image forming apparatus, based on the print job and a setting content of the predetermined output operation set in the image forming apparatus, the setting content being set independently of a setting of the image output operation corresponding to the print job.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 8 is a view showing an example of an automatic density adjustment screen G5;

FIG. 9 is a view showing an example of a job setting screen G6;

FIG. 10 is a view showing an example of a preview screen G7;

FIG. 18A is a view showing an example of display transition of the preview screen in the conventional image forming apparatus which does not reflect the machine setting in the preview;

FIG. 18B is a view showing an example of display transition of the preview screen G7 in which the sample sheet is discriminably displayed in the image forming apparatus 1 according to Variation 2; and FIGS. 19A and 19B are flowcharts each showing an example of the preview screen display processing executed in an image forming apparatus 1 according to Variation 3.

DETAILED DESCRIPTION OF THE PREFERRED EMBODIMENT

Embodiments of the present invention will be described below with reference to the drawings.

Figure 1:
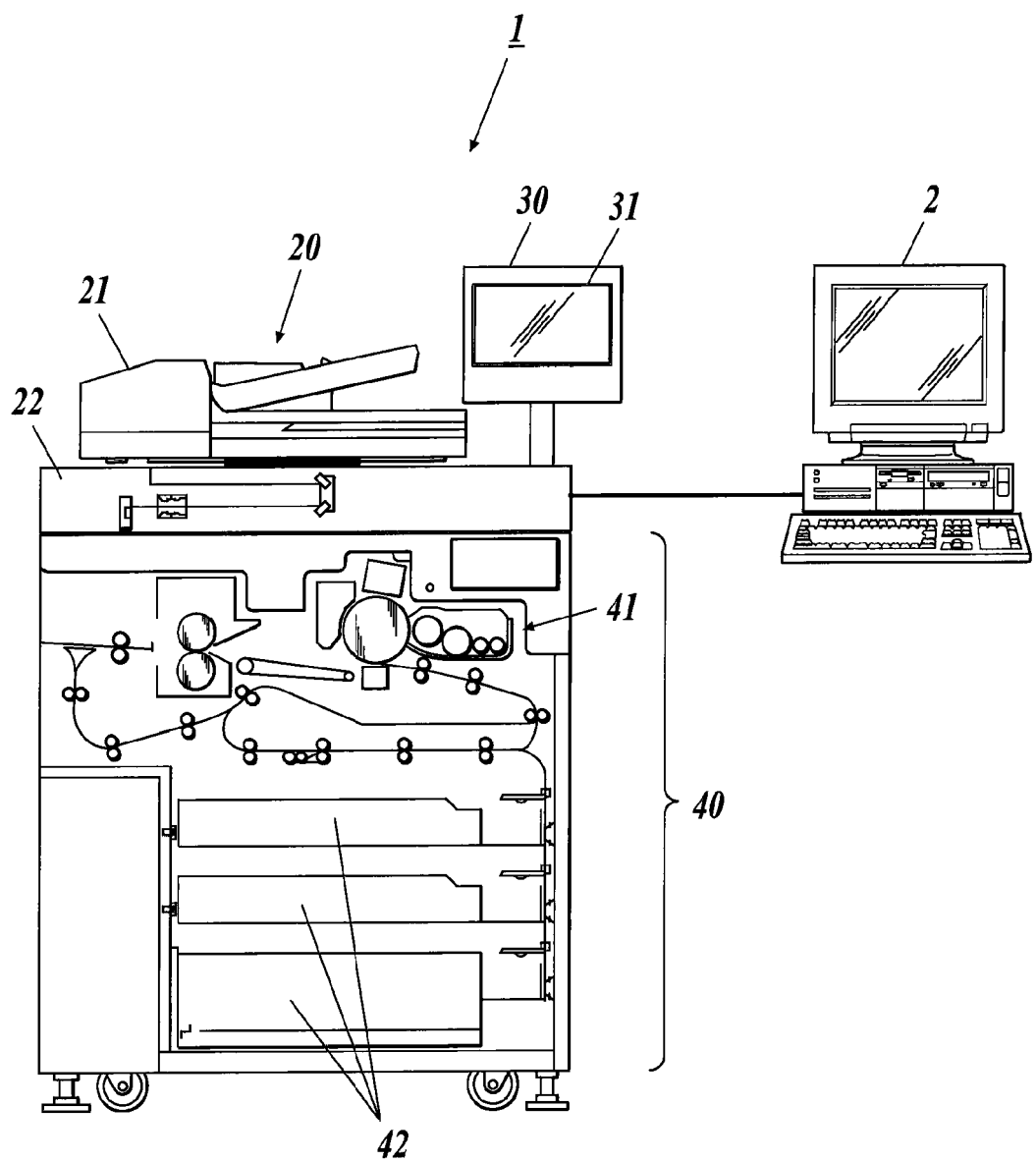
FIG. 1 is a view showing a schematic configuration of an image forming apparatus 1 according to an embodiment of the invention.
Figure 2:
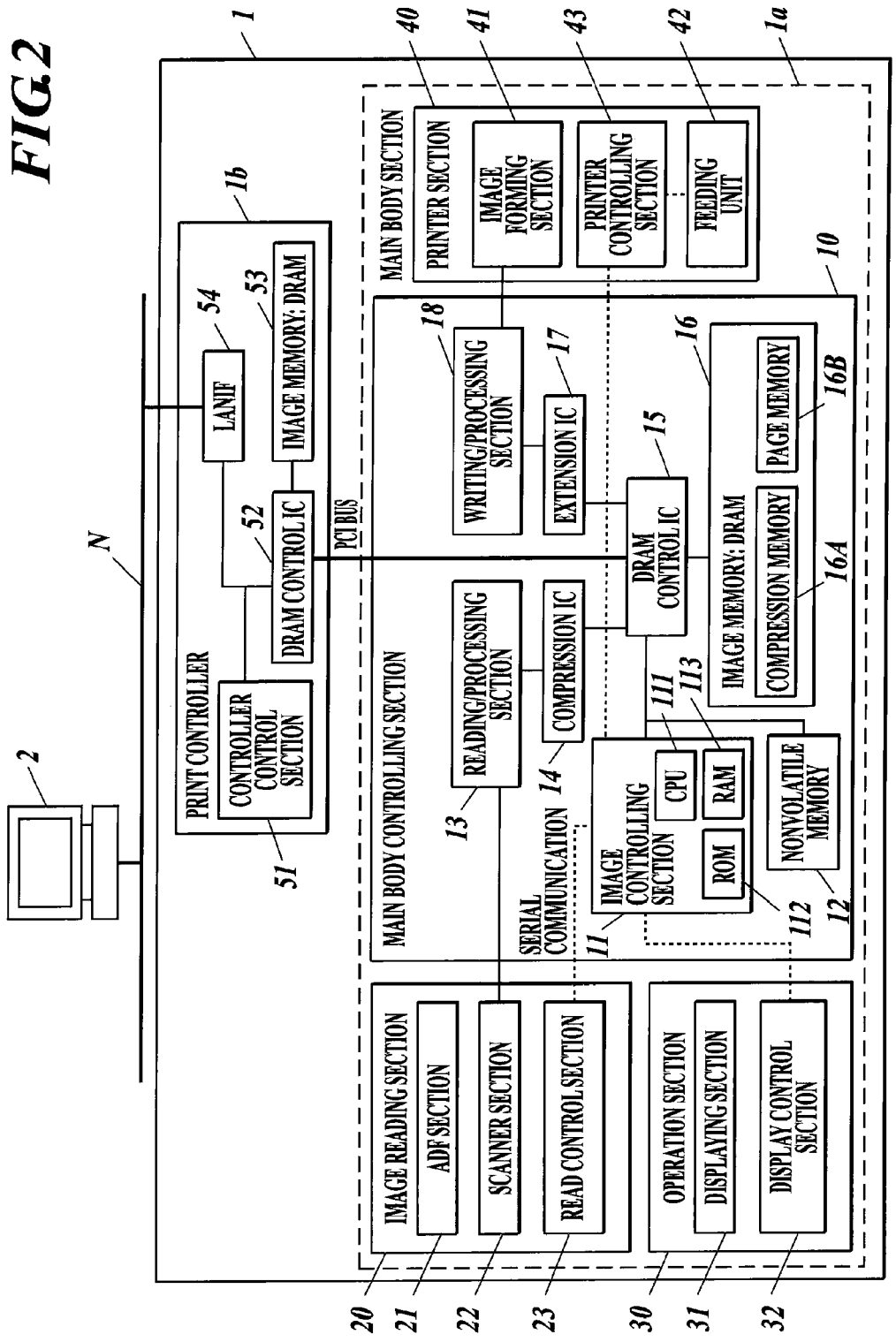
FIG. 2 is a functional block diagram showing the image forming apparatus 1 according to the embodiment.

FIG. 1 is a view showing a schematic configuration of an image forming apparatus 1 according to an embodiment of the invention. FIG. 2 is a functional block diagram showing the image forming apparatus 1 according to the embodiment.

The image forming apparatus 1 is a digital MFP (multi function peripheral) which forms an image of image data read from an original document on a sheet (recording medium) to output the image-formed sheet, or forms the image on the sheet based on a print job received from an external device or the like to output the image-formed sheet. The image forming apparatus 1 may be configured to include a finishing processing section which performs punching, stapling, folding, cutting, and the like to the sheet on which the image is formed.

As illustrated in FIGS. 1 and 2, the image forming apparatus 1 includes a main body 1a and a print controller 1b, and is connected to an external device 2 on a network N through a LANIF (Local Area Network InterFace) 54 of the print controller 1b such that the image forming apparatus 1 and the external device 2 can transmit/receive information to/from each other.

The main body 1a includes a main body controlling section 10, an image reading section 20, an operation section 30, and a printer section 40.

The main body controlling section 10 includes an image controlling section 11, a nonvolatile memory 12, a reading/processing section 13, a compression IC (Integrated Circuit) 14, a DRAM control IC 15, an image memory 16, an extension IC 17, and a writing/processing section 18.

The image controlling section 11 as one aspect of a control section includes a CPU (Central Processing Unit) 111, a ROM (Read Only Memory) 112, and a RAM (Random Access Memory) 113 to control each section of the image forming apparatus 1.

The CPU 111 reads a processing program and the like stored in the ROM 112 to expand the read program in the RAM 113, and executes various pieces of processing in conjunction with the expanded program, thereby controlling the whole of the image forming apparatus 1.

Figure 3:
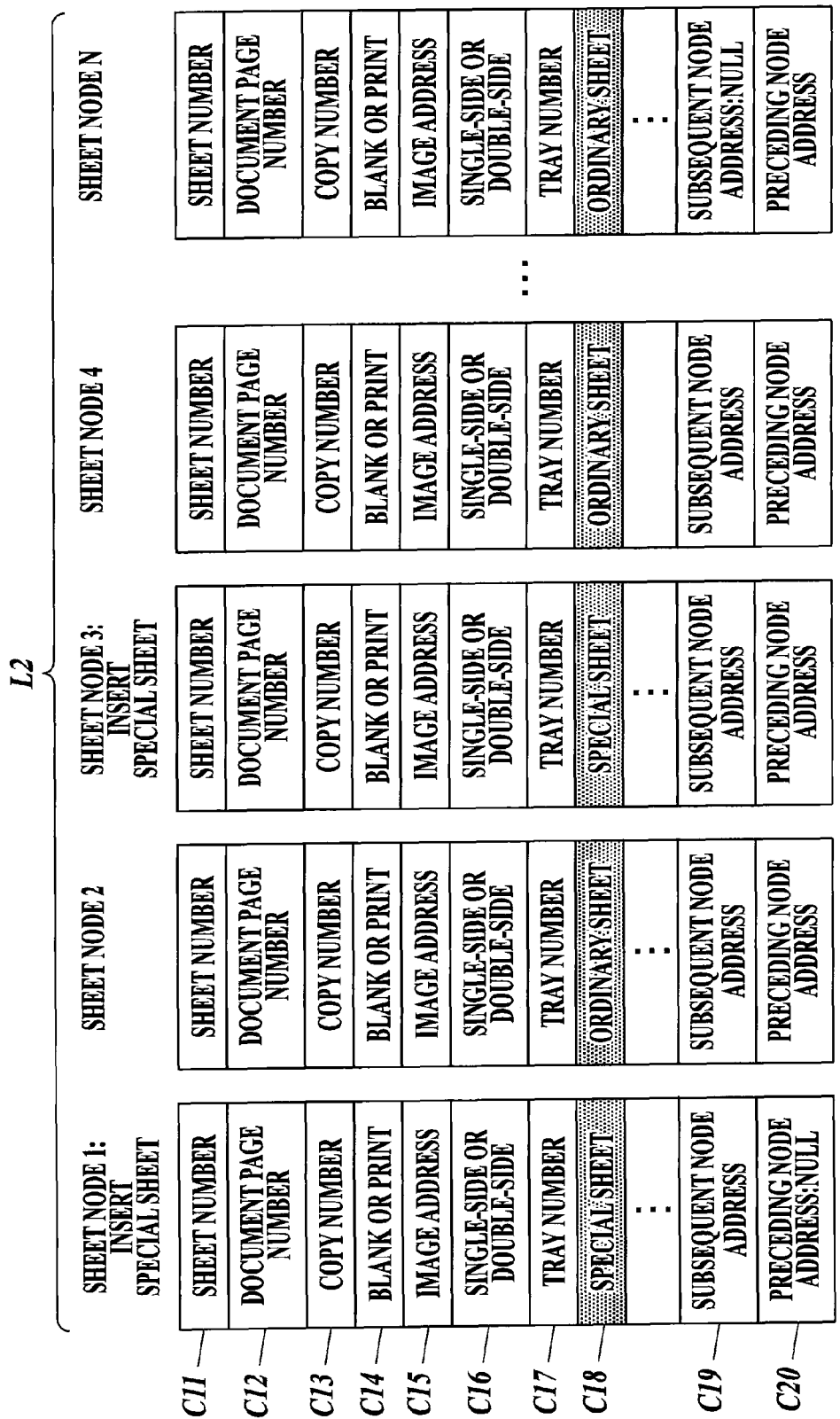
FIG. 3A is a view showing an example of a job output list (first output list L1)
FIG. 3B is a view showing an example of a job output list (second output list L2)

For example, the ROM 112 is composed of a semiconductor memory, and the processing program, data, and so on are previously stored in the ROM 112. For example, a preview screen display program for displaying a preview screen on a displaying section 31 based on a job output list (see FIG. 3) is stored in the ROM 112.

In the RAM 113 as one aspect of the storage, the processing program executed by the CPU 111 is expanded in a program storage area thereof, and input data and a processing result generated in executing the processing program are stored in the program storage area. The RAM 113 also stores a job setting (for example, insertion of a slip sheet and attachment of a cover page) set to each print job, the job output list (for example, a first output list L1 and a second output list L2), and so on.

An example of the job output list will be described with reference to FIGS. 3A and 3B.

The job output list is information in which contents (such as an image scheduled to be output, the slip sheet, the cover page, a partition sheet, a sample sheet, and an automatic density adjustment sheet) scheduled to be output according to an output operation performed by the image forming apparatus 1 are arrayed in an output order on a predetermined output unit basis (for example, on a page basis) (see FIGS. 3A and 3B).

As illustrated in FIGS. 3A and 3B, the job output list includes a job output list (first output list L1) in which a job setting is reflected, and a job output list (second output list L2) in which a machine setting (see FIG. 4 for details) of the image forming apparatus 1 is reflected in addition to the first output list L1.

As illustrated in FIG. 3A, the first output list L1 includes a plurality of nodes (sheet nodes 1, 2, ..., and N) each corresponding to the output sheet of the print job, and the sheet nodes are arrayed in the order (output order) of priority of image formation.

Each of the sheet nodes 1, 2, ..., and N includes an area in which pieces of information corresponding to various items each defining an output condition for each sheet are stored. Examples of the items include a sheet number C1, a document page number C2, a copy number C3, blank or print C4, an image address C5, single-side or double-side C6, a tray number C7, an ordinary sheet C8, ..., a subsequent node address C9, and a preceding node address C10.

The item of the ordinary sheet C8 is one to which an "ordinary sheet" or a "special sheet" is set as an output recording medium as described later (for example, see ordinary sheet/special sheet C18 in FIG. 3B). However, because the machine setting is not reflected in the first output list L1, the "special sheet" is not set but only the "ordinary sheet" is set. "NULL" indicating a state of no setting is stored in each of the subsequent node address C9 of the final sheet node N and the preceding node address C10 of the head sheet node 1.

As illustrated in FIG. 3B, similarly to the first output list L1, the second output list L2 includes a plurality of sheet nodes 1, 2, ..., and N, and the sheet nodes are arrayed in the order (output order) of priority of image formation.

Each of the sheet nodes 1, 2, ..., and N includes an area in which pieces of information corresponding to various items each defining an output condition for each sheet are stored. Examples of the items include a sheet number C11, a document page number C12, a copy number C13, blank or print C14, an image address C15, single-side or double-side C16, a tray number C17, an ordinary sheet/special sheet C18, ..., a subsequent node address C19, and a preceding node address C20.

In FIG. 3B, the "special sheets" are set to the ordinary sheet/special sheet C18 of the sheet nodes 1 and 3, and the "special sheets" are output as the first and third sheets among the sheets output in the print job corresponding to the second output list L2. In other words, in the second output list L2, when the output sheet of the sheet data corresponding to each of the sheet nodes 1, 2, ..., and N is the "special sheet", whether the output sheet is the "ordinary sheet" or the "special sheet" can be discriminated by setting the "special sheet" to the ordinary sheet/special sheet C18. As used herein, the "special sheet" means a sheet which is used in an output operation performed based on the machine setting. For example, the "special sheet" include the partition sheet, the sample sheet, and the automatic density adjustment sheet.

FIGS. 3A and 3B illustrate the first output list and the second output list by way of example. The various pieces of stored information are not limited to the first output list and the second output list, but the pieces of stored information can arbitrarily be changed as appropriate.

The nonvolatile memory 12 stores data including the data of the print job which is read by a scanner section 22 to be generated, and the data of the print job which is received from the external device 2 through the print controller 1b. The nonvolatile memory 12 stores pieces of setting information on various setting conditions which are set based on a user operation in setting screens (partition sheet setting screen G3, sample sheet discharge setting screen G4, and automatic density adjustment screen G5) for machine settings illustrated in FIGS. 6 to 8.

The reading/processing section 13 produces digital image data by executing various pieces of processing such as shading correction processing and A/D conversion processing to an analog image signal input from the image reading section 20. The produced digital image data is output to the compression IC 14.

The compression IC 14 executes compression processing to the input digital image data to output the digital image data to the DRAM control IC 15.

According to an instruction from the image controlling section 11, the DRAM control IC 15 controls compression processing executed to the image data by the compression IC 14 and extension processing executed to the compressed image data by the extension IC 17, and controls input/output of the image data to and from the image memory 16. For example, when an instruction to store the image data read by the image reading section 20 is provided, the DRAM control IC 15 causes the compression IC 14 to execute the compression processing of the image data input from the reading/processing section 13 and causes a compression memory 16A of the image memory 16 to store the compressed image data. When an instruction to execute the print output of the compressed image data stored in the compression memory 16A is provided, the DRAM control IC 15 reads the compressed image data from the compression memory 16A, causes the extension IC 17 to execute extension processing, and causes a page memory 16B to store the image data. The DRAM control IC 15 reads the uncompressed image data from the page memory 16B and outputs the image data to the writing/processing section 18. The DRAM control IC 15 deletes the image data whose image is already formed from the compression memory 16A and the page memory 16B after an image forming section 41 forms the image.

The image memory 16 is composed of a DRAM (Dynamic RAM) for example, and includes the compression memory 16A and the page memory 16B. The compression memory 16A is one in which the compressed image data is stored, and the page memory 16B is one in which the uncompressed image data to be printed is temporarily stored before the image formation.

The extension IC 17 performs the extension processing to the input compressed image data.

Based on the image data to be printed input from the DRAM control IC 15, the writing/processing section 18 produces the printing image data for forming the image, and outputs the printing image data to the printer section 40.

The image reading section 20 includes an ADF (Auto Document Feeder) section 21, the scanner section 22, and a read control section 23. In response to an instruction from the image controlling section 11, the read control section 23 controls the ADF section 21 and the scanner section 22 to perform light scan of a document surface and outputs the read analog image signal to the reading/processing section 13.

Specifically, the document placed on a document tray of the ADF section 21 is conveyed to a contact glass which is a read point of the scanner section 22, the document surface is exposed and scanned, a CCD (Charge Coupled Device) executes photoelectric conversion of the light reflected from the document surface, and the single-side or double-side image of the document is read. The image includes not only the image data such as a graphic and a photograph but also a text data such as a character and a sign. The image (analog image signal) read by the scanner section 22 is output to the reading/processing section 13, the A/D conversion of the image and various pieces of image processing are executed by the main body controlling section 10, and the image is output to the printer section 40.

The operation section 30 includes a displaying section 31, a display control section 32, and various function buttons (not shown) such as a numerical button and a start button.

The displaying section 31 as one aspect of an informing section includes an LCD (Liquid Crystal Display) and a touch panel which is provided so as to cover the LCD. When receiving an input operation by a user, the displaying section 31 outputs the input information to the main body controlling section 10. The displaying section 31 displays various setting screens (see FIGS. 4 to 10) for inputting various setting conditions and various processing results according to a display signal input from the main body controlling section 10.

The display control section 32 outputs an operation signal obtained by operations of the various function buttons or the touch panel to the image controlling section 11. The display control section 32 causes the displaying section 31 to display the various setting screens and the various processing results in response to the instruction from the image controlling section 11.

The various setting screens displayed on the displaying section 31 will be described with reference to FIGS. 4 to 10.

Figure 4:
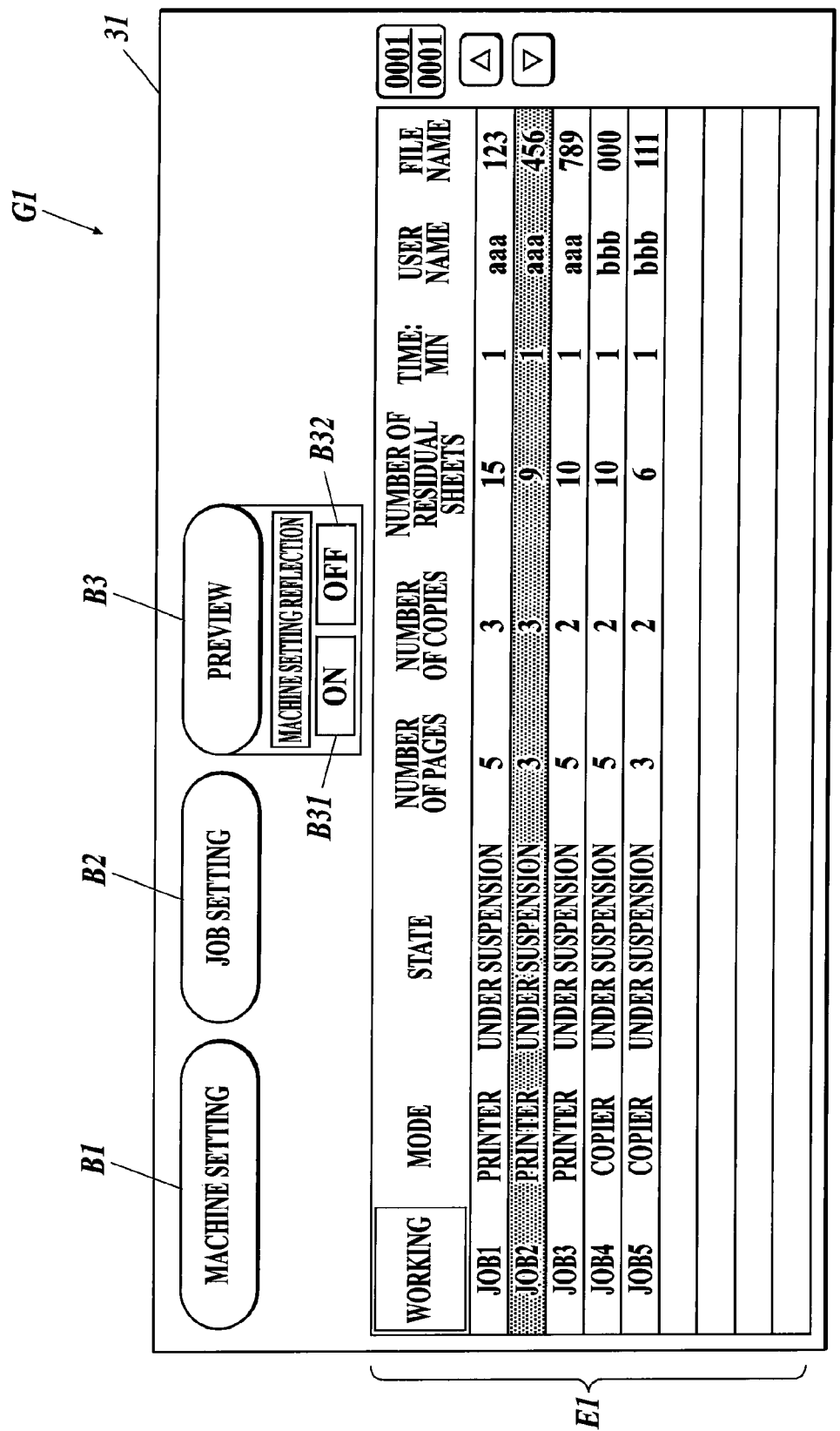
FIG. 4 is a view showing an example of a job list screen G1.

FIG. 4 is a view showing an example of a job list screen G1.

As illustrated in FIG. 4, the displaying section 31 displays a machine setting button B1, a JOB setting button B2, and a preview button B3 in a job list screen G1. The displaying section 31 also displays a job list display area E1 where the job list in print waiting. Moreover, the displaying section 31 displays a machine setting ON button B31 which reflects the machine setting in the preview and a machine setting OFF button 32 which does not reflect the machine setting in the preview below the preview button B3.

As used herein, the machine setting means setting contents of a predetermined output operation which is set in the image forming apparatus 1 itself irrespective of the presence or absence of the job setting. The machine setting may be set before or after the job setting.

The predetermined output operation which is set in the image forming apparatus 1 means various processing operations to be performed by the image forming apparatus 1 based on information set independently of the print job (job setting). In other words, the predetermined output operation set in the image forming apparatus 1 includes not only the operation to be performed with respect to the image output operation corresponding to one print job but also the operation which is commonly performed with respect to the image output operations corresponding to a plurality of print jobs, and is performed based on the machine setting set by setting processing irrespective of any print job. As the predetermined output operation set in the image forming apparatus 1, the insertion of the partition sheet, the discharge of the sample sheet, the insertion of the automatic density adjustment sheet, and so on may be cited.

The image output operation corresponding to the print job means various output operations to be performed based on the print job. In other words, the image output operation corresponding to the print job may be performed independently of the presence or absence of image formation on the output recording medium as long as the image output operation is performed based on the setting (job setting) of the print job. Thus, the image output operation corresponding to the print job includes the insertion of the slip sheet and the attachment of the cover page.

When the user presses the machine setting button B1 in the job list screen G1, the display control section 32 causes the displaying section 31 to display a machine setting screen G2 (see FIG. 5) in the display area thereof. When the JOB setting button B2 is operated/pressed, the display control section 32 causes the displaying section 31 to display a job setting screen G6 (see FIG. 9) in the display area thereof. When the preview button B3 is operated/pressed, the display control section 32 causes the displaying section 31 to display a preview screen G7 (see FIG. 10) in the display area. However, in order to display the preview screen G7, it is necessary to previously select, in the job list display area E1, the job which is desired to be previewed. For example, as illustrated in FIG. 4, the preview screen G7 of "JOB 2" is displayed, when the preview button B3 is operated/pressed while selecting "JOB2".

When the user presses the machine setting ON button B31 in the job list screen G1, the display control section 32 causes the displaying section 31 to display the preview screen G7 in the display area thereof while the display control section 32 makes the machine setting reflected in the preview screen G7. On the other hand, when the machine setting OFF button B32 is operated/pressed, the display control section 32 causes the displaying section 31 to display the preview screen G7 in the display area thereof while the display control section 32 does not make the machine setting reflected in the preview screen G7.

When the pressing operation of the preview button B3 of the touch panel of the operation section 30 by the user is detected in the job list screen G1, the display control section 32 outputs an informing instruction corresponding to the operation to the image controlling section 11.

As used herein, the informing instruction means an instruction to cause the displaying section 31 to display output content confirmation information for confirming one or more scheduled output contents relating to each of the output operation according to the control of the CPU 111 of the image controlling section 11. As an example of the informing instruction, a preview instruction to cause the displaying section 31 to display the preview screen G7 can be cited for example.

Figure 5:
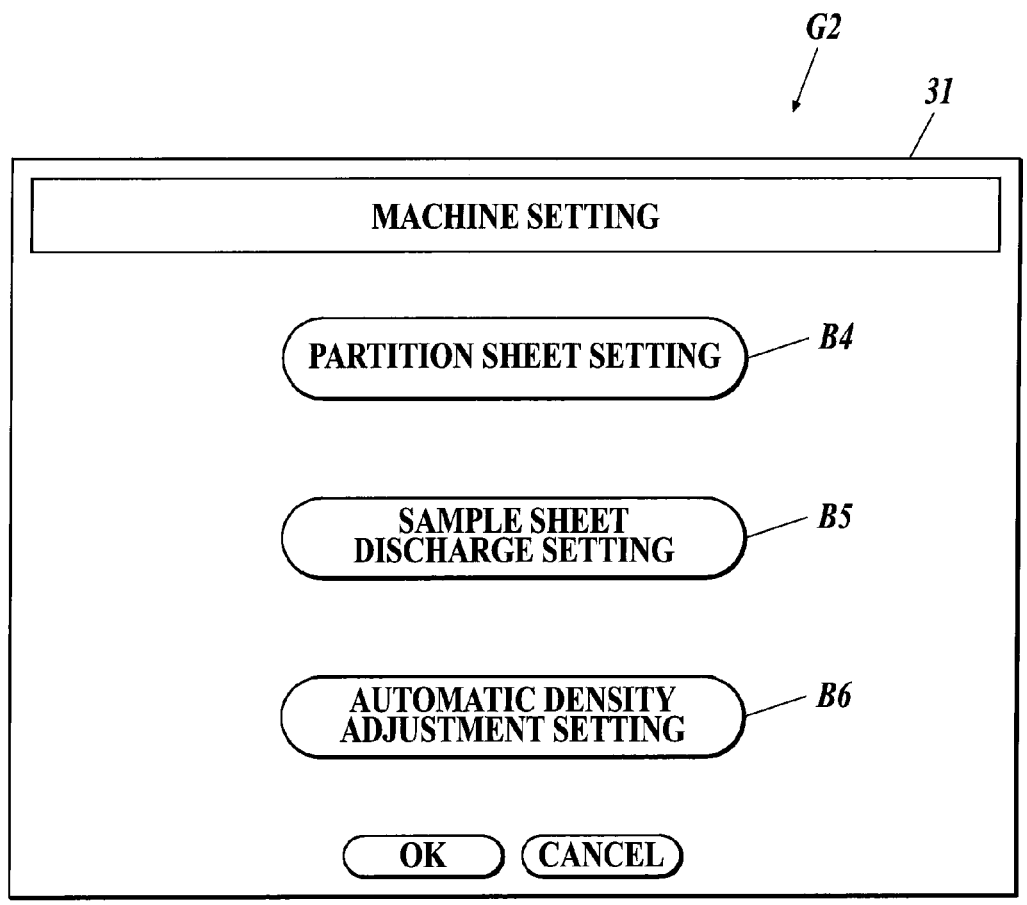
FIG. 5 is a view showing an example of a machine setting screen G2.

FIG. 5 is a view showing an example of a machine setting screen G2.

As illustrated in FIG. 5, the displaying section 31 displays a partition sheet setting button B4, a sample sheet discharge setting button B5, and an automatic density adjustment button B6 in the machine setting screen G2 thereof.

When the user presses the partition sheet setting button B4 in the machine setting screen G2, the display control section 32 causes the displaying section 31 to display a partition sheet setting screen (see FIG. 6) in the display area thereof. When the sample sheet discharge setting button B5 is operated/pressed, the display control section 32 causes the displaying section 31 to display a sample sheet discharge setting screen G4 (see FIG. 7) in the display area thereof. When the automatic density adjustment button B6 is operated/pressed, the display control section 32 causes the displaying section 31 to display an automatic density adjustment screen G5 (see FIG. 8) in the display area thereof.

Figure 6:
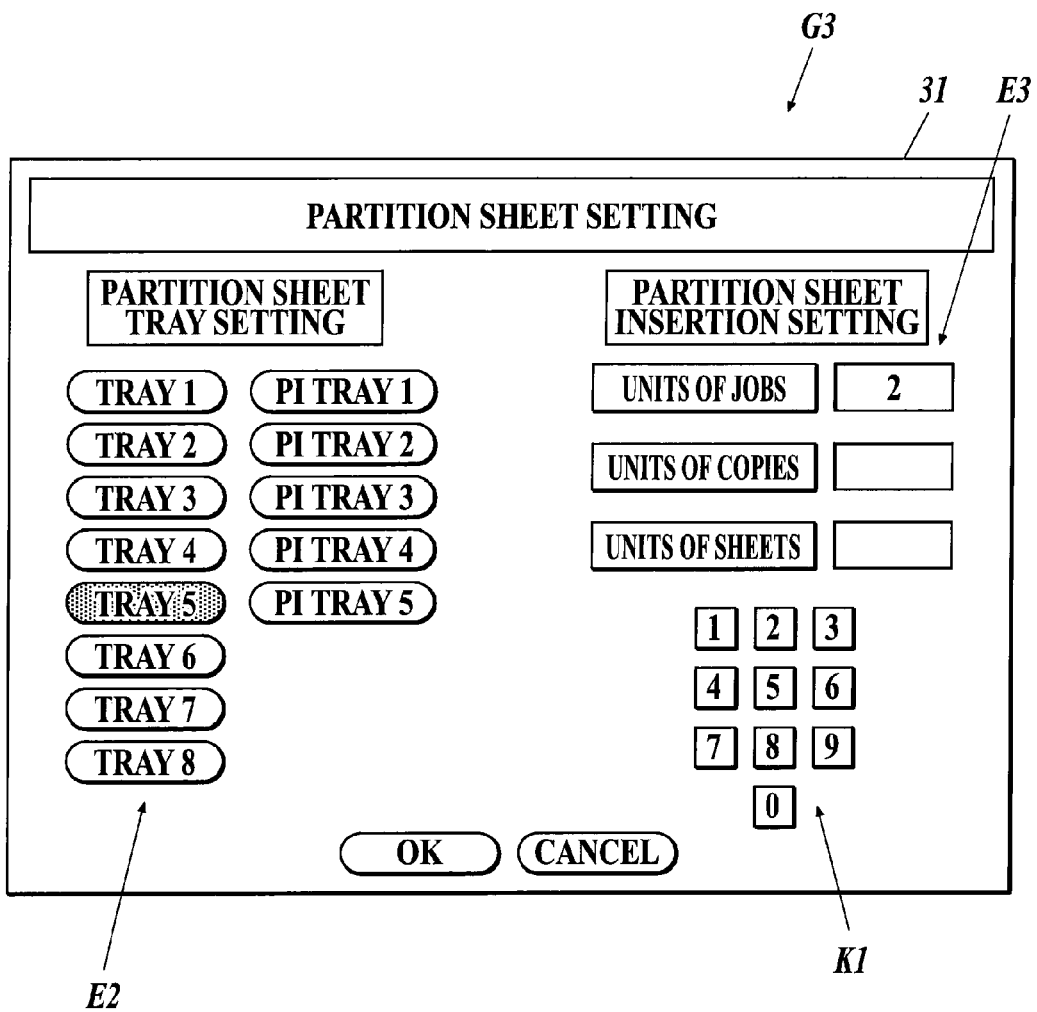
FIG. 6 is a view showing an example of a partition sheet setting screen G3.

FIG. 6 is a view showing an example of a partition sheet setting screen G3.

As illustrated in FIG. 6, in the partition sheet setting screen G3, the displaying section 31 displays a partition sheet tray setting area E2 for setting a tray for feeding (storing) the partition sheet, a partition sheet insertion setting area E3 for setting timing of partition sheet insertion, and a numerical keypad K1 for inputting a numerical value. The timing of partition sheet insertion can be set in units of JOBs, units of copies, or units of sheets. For example, in FIG. 6, the partition sheet is fed from the tray 5 in each output of 2 (two) JOBs, because "tray 5" is set as the partition sheet tray and "in units of 2 JOBs" is set as the insertion timing.

Figure 7:
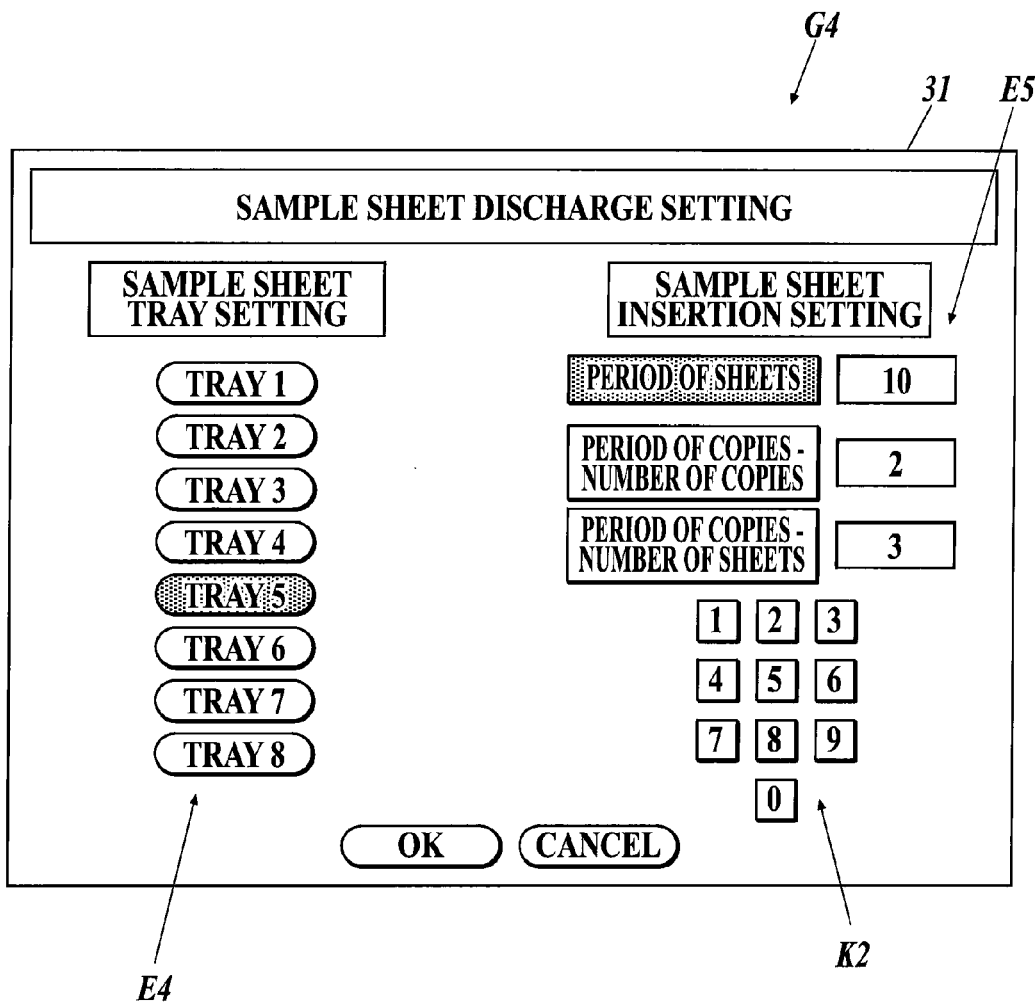
FIG. 7 is a view showing an example of a sample sheet discharge setting screen G4.

FIG. 7 is a view showing an example of a sample sheet discharge setting screen G4.

As illustrated in FIG. 7, in the sample sheet discharge setting screen G4, the displaying section 31 displays a sample sheet tray setting area E4 for setting a tray for feeding (storing) the sample sheet, a sample sheet insertion setting area E5 for setting timing of sample sheet insertion, and a numerical keypad K2 for inputting a numerical value. The timing of sample sheet insertion can be set in a period of sheets or a period of copies. For example, in FIG. 7, the sample sheet is output from the tray 5 in each output of 10 (ten) sheets, because "tray 5" is set as the sample sheet tray and "period of 10 sheets" is set as the insertion timing. When the insertion timing is switched from the state of FIG. 7 to the period of copies (2-copy and 3-sheet period), the sample sheet is fed from the tray 5 when outputting the third sheet of the second copy in each job, and the sample sheet is discharged.

FIG. 8 is a view showing an example of an automatic density adjustment screen G5.

As illustrated in FIG. 8, in the automatic density adjustment screen G5, the displaying section 31 displays an output sheet density adjustment use determining area E6 for determining whether or not density of an output sheet is adjusted, an adjustment intensity determining area E7 for determining intensity of the density adjustment, an automatic adjustment determining area E8 for determining whether or not automatic adjustment is performed, an adjustment interval determining area E9 for determining an adjustment interval, and an on-the-job adjustment determining area E10 for determining whether or not the adjustment is performed on the job. For example, in FIG. 8, a density adjustment sheet is output in each output of 5000 sheets because "do" is set in the output sheet density adjustment use determining area E6 and "each 5000 sheets" is set in the adjustment interval determining area E9.

FIG. 9 is a view showing an example of a job setting screen G6.

As illustrated in FIG. 9, in the job setting screen G6, the displaying section 31 displays the number of copies/print surface area E11 for setting the total number of output copies of the print job and a surface of the sheet on which the image is formed, a document setting area E12 for setting the output sheet of the print job, an image quality setting area E13 for setting image quality, a magnification setting area E14 for setting magnification of the output sheet, an output condition setting area E15 for setting the output condition, an output setting area E16 for setting an output destination (sheet discharge tray) of the sheet on which the image is formed or the finishing processing, and an application setting area E17 for setting application.

In the various setting screens shown in FIGS. 6 to 9, when a predetermined operation of the operation section 30 by the user is detected, the display control section 32 outputs an information production start instruction for producing setting information corresponding to the operation to the image controlling section 11. The setting information means setting-condition-related information input in the predetermined area, including information on the numerical value, information on the pressed button, and the like.

Among the pieces of setting information output to the image controlling section 11, the pieces of setting information which are set based on the user operation in the setting screens (partition sheet setting screen G3, sample sheet discharge setting screen G4, and automatic density adjustment screen G5) relating to the machine setting are output from the image controlling section 11 to the nonvolatile memory 12 and stored therein. The setting information set based on the user operation in the setting screen relating to the job setting (job setting screen G6) is stored in the RAM 112 of the image controlling section 11.

Based on the information production start instruction input by the predetermined operation of the operation section 30 by the user, the CPU 111 of the image controlling section 11 produces information as the output content confirmation information (for example, the second output list L2). In the information, one or more scheduled output contents regarding the image output operation corresponding to the print job and one or more scheduled output contents regarding the predetermined output operation set in the image forming apparatus 1 are arrayed in the output order in each predetermined output unit. Specifically, the CPU 111 obtains the setting information on the image output operation corresponding to the print job from the RAM 113 and obtains the setting information on the predetermined output operation set in the image forming apparatus 1 from the nonvolatile memory 12, and the CPU 111 arrays the pieces of setting information in the output order according to the item defining the output condition in each predetermined output unit, thereby producing the output content confirmation information.

The CPU 111 of the image controlling section 11 stores the produced output content confirmation information (for example, the second output list L2) in the RAM 113.

FIG. 10 is a view showing an example of a preview screen G7.

As illustrated in FIG. 10, in the preview screen G7, the displaying section 31 displays a preview display area E18 for displaying the preview of the output sheet, a two-sided switching area E19 for assigning which surface of the document is previewed, a display sheet switching area E20 for switching between the previewed sheets, a sheet number display area E21 for displaying the sheet number of the currently-displayed sheet, a message display area E22 for displaying various messages to the user, a sheet information display area E23 for displaying various attributes of the currently-displayed sheet in the text form, and so on. When the job list screen G1 is switched to the preview screen G7 by the pressing operation of the preview button B3 of FIG. 4, the preview of the head sheet of the job is displayed as initial display in the preview display area E18.

For example, the CPU 111 of the image controlling section 11 executes preview screen display processing to be hereinafter described, whereby the preview screen G7 illustrated in FIG. 10 is displayed on the displaying section 31.

In other words, based on the print job and the setting contents of the predetermined output operation which are set separately from the setting of the image output operation corresponding to the print job in the image forming apparatus 1, the CPU 111 of the image controlling section 11 causes the displaying section 31 to display the output content confirmation information (for example, second output list L2) for confirming the contents of the image output operation corresponding to the print job and the contents of the predetermined output operation set in the image forming apparatus 1. Specifically, the CPU 111 of the image controlling section 11 produces display screen data (for example, preview image) based on the output content confirmation information (for example, second output list L2), and causes the displaying section 31 to display the display screen data (for example, preview screen G7) in conjunction with the display control section 32.

The printer section 40 includes the image forming section 41, a feeding unit 42, and a printer controlling section 43.

The image forming section 41 includes a photosensitive drum as an image bearing member, a charging section which charges the photosensitive drum, an exposure section which exposes and scans the surface of the photosensitive drum based on the image data, a development section which develops an electrostatic latent image on the photosensitive drum, a transfer section which transfers a toner image formed on the photosensitive drum to a recording sheet, a cleaning section which removes residual toner on the photosensitive drum, and a fixing section which fixes the toner image formed on the recording sheet. The image forming section 41 forms the image on the recording sheet as the recording medium fed from the feeding unit 42. In the embodiment, the image formation processing is performed by an electrophotographic system by way of example. Alternatively, the image may be formed by other printing system such as an inkjet system and a thermal sublimation system.

The printer controlling section 43 controls an operation of each section of the printer section 40 in response to the instruction from the image controlling section 11, and causes the printer section 40 to form the image on the sheet based on the print image data input from the writing/processing section 18.

Each section of the print controller 1b will be described below.

The print controller 1b manages and controls the print job input from the external device 2 connected to the network N to the image forming apparatus 1, when the image forming apparatus 1 is used as a network printer. The print controller 1b receives data to be printed from the external device 2 and transmits the data as the print job data to the main body 1a.

The print controller 1b includes a controller control section 51, a DRAM control IC 52, an image memory 53, and a LANIF 54.

The controller control section 51 totally controls an operation of each section of the print controller 1b and outputs image data input from the external device 2 through the LANIF 54 as the print job to the main body 1a.

The DRAM control IC 52 controls the storage of the image data received by the LANIF 54 in the image memory 53 and the read of the image data from the image memory 53. The DRAM control IC 52 is connected to the DRAM control IC 15 of the main body controlling section 10 through a PCI (Peripheral Components Interconnect) bus, and reads the image data to be printed from the image memory 53 to output the image data to the DRAM control IC 15 in response to the instruction from the controller control section 51.

For example, the image memory 53 is composed of a DRAM, and the input image data is temporarily stored in the image memory 53.

The LANIF 54 is a communication interface such as a NIC (Network Interface Card) and a modem, and receives the image data to be printed from the external device 2 through the network N. The received image data is output to the DRAM control IC 52.

The external device 2 produces the data of the print job to be printed by the user operation, and transmits the data to the image forming apparatus 1 through the network N. The external device 2 may include a displaying section which displays the preview screen G7. The external device 2 can include mobile devices such as a PC, a server device, and a PDA.

An operation of the image forming apparatus 1 according to the embodiment will be described below.

First, the preview screen display processing for reflecting the job setting in the preview will be described with reference to a flowchart of FIG. 11. The preview screen display processing is implemented by the CPU 111 of the image controlling section 11 executing a preview screen display program stored in the ROM 112.

Figure 11:
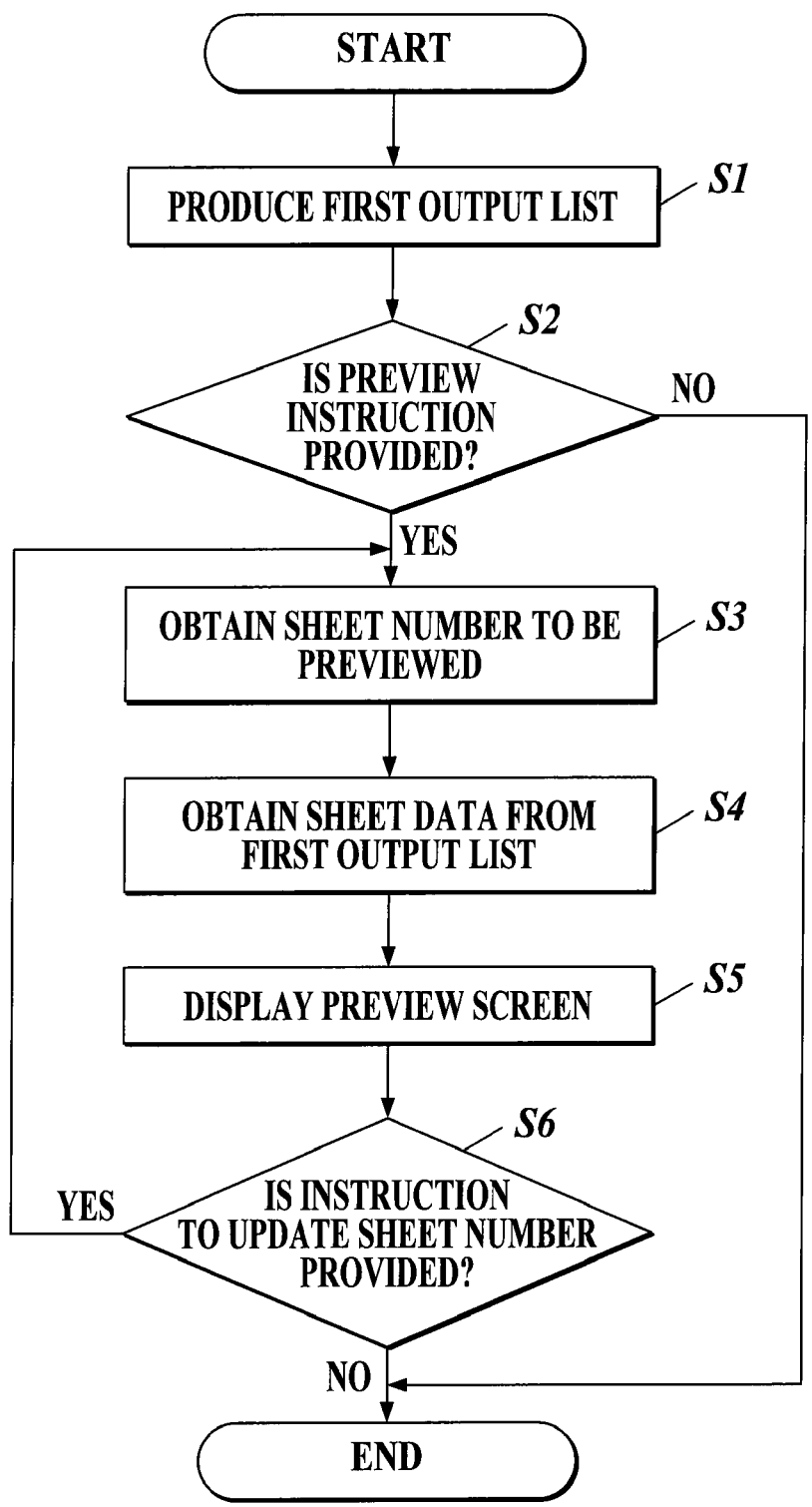
FIG. 11 is a flowchart showing an example of a preview screen display processing for reflecting a job setting in a preview.

As illustrated in FIG. 11, the job output list (first output list L1, see FIG. 3A) in which the job setting is reflected is created in Step S1. Specifically, the pieces of setting information on the job setting are obtained from the RAM 112, and the first output list L1 is created by arraying the pieces of setting information in the output order according to the items defining the output conditions of each sheet.

The first output list L1 created in Step S1 is stored in the RAM 113.

A determination whether or not the user provides the preview instruction is made in Step S2. Specifically, when the pressing operation of the preview button B3 by the user is detected, the determination that the user provides the preview instruction is made. When the user provides the preview instruction (Step S2: YES), the flow goes to Step S3. On the other hand, when it is determined that the user does not provide the preview instruction (Step S2: NO), the preview screen display processing ends.

In Step S3, the sheet number of the sheet to be previewed is obtained. In the case of transition (transition from Step S2) associated with the pressing operation of the preview button B3, "1" is obtained as the sheet number because the head sheet is to be previewed. On the other hand, in the case of transition (transition from Step S6) associated with an instruction to update the sheet number, the sheet number is obtained in response to the update instruction.

In Step S4, the sheet data corresponding to the sheet number obtained in Step S3 is obtained from the first output list L1 created in Step S1. For example, when the obtained sheet number is "1", the sheet data of the sheet node in which "1" is set to the sheet number C1 of the first output list L1 is obtained.

In Step S5, the displaying section 31 displays the preview screen G7 based on the sheet data obtained in Step S4. Specifically, the document image to be printed on the sheet is calculated from the obtained sheet data, the preview image is produced by executing various pieces of extension processing to the document image stored in the compression memory 16A, and the displaying section 31 displays the preview image.

In Step S6, it is determined whether or not the user provides the instruction to update the sheet number. Specifically, when the display sheet switching operation performed in the display sheet switching area E20 of the preview screen G7 is detected, it is determined that the user provides the instruction to update the sheet number. When it is determined that the instruction to update the sheet number is provided (Step S6: YES), the flow goes to Step S3. On the other hand, when it is determined that the instruction to update the sheet number is not provided (Step S6: NO), the preview screen display processing ends.

Thus, the image forming apparatus 1 according to the embodiment causes the displaying section 31 to display the preview screen G7 based on the sheet data obtained from the first output list L1.

Then, the preview screen display processing for reflecting the machine setting in the preview in addition to the job setting will be described with reference to a flowchart of FIG. 12.

Figure 12:
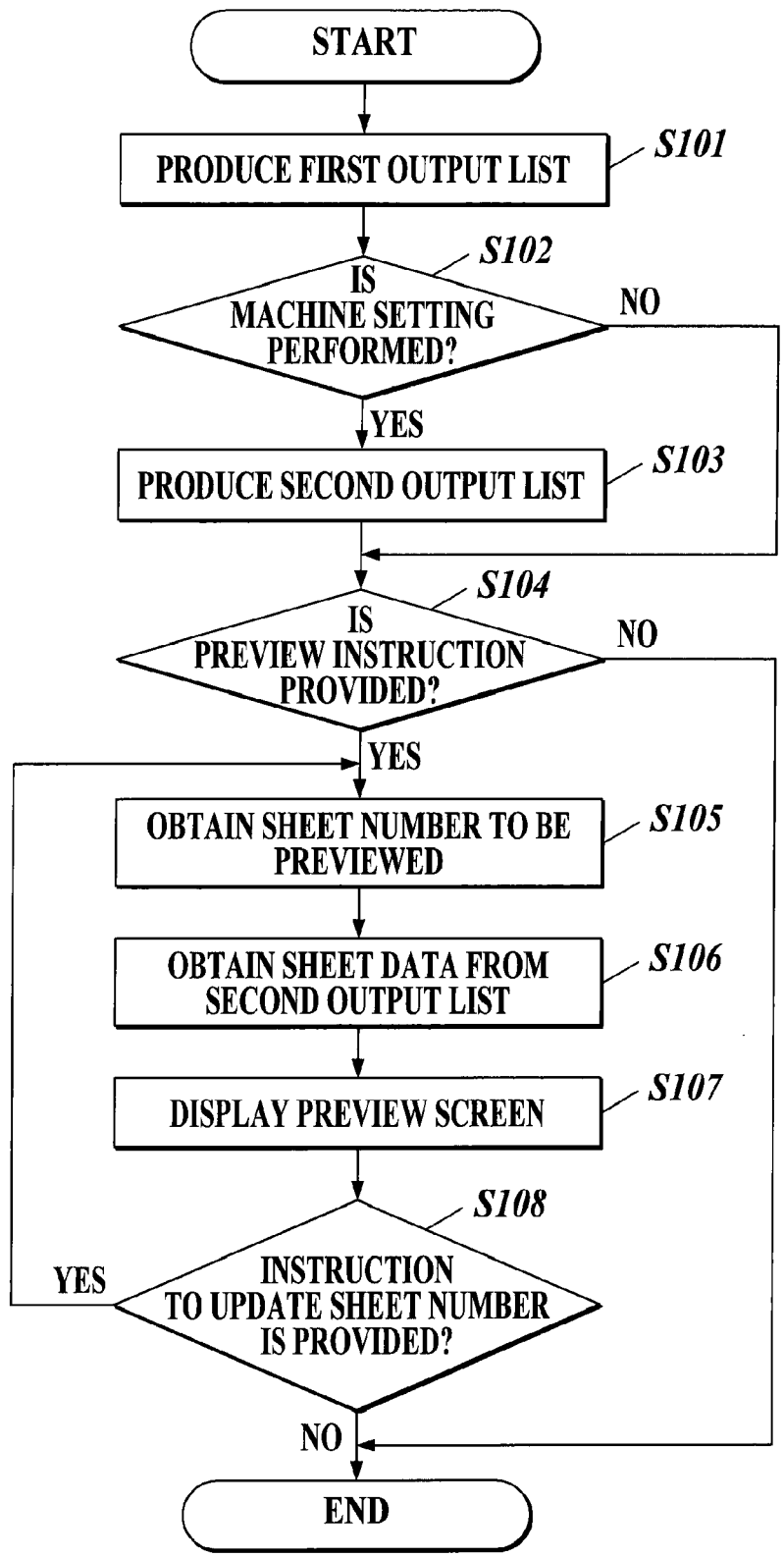
FIG. 12 is a flowchart showing an example of the preview screen display processing executed in the image forming apparatus 1 according to the embodiment.

FIG. 12 is a flowchart showing an example of the preview screen display processing executed in the image forming apparatus 1 according to the embodiment. The preview screen display processing is implemented by the CPU 111 of the image controlling section 11 executing the preview screen display program stored in the ROM 112 when the print job is newly produced or when the print job is obtained.

As illustrated in FIG. 12, the job output list (first output list L1, see FIG. 3A) in which the job setting is reflected is created in Step S101. The method of producing the first output list L1 is substantially similar to that of the preview screen display processing of FIG. 11, and the detailed description will not be repeated.

The first output list L1 created in Step S101 is stored in the RAM 113.

In Step S102, it is determined whether or not the machine setting relating to the special sheet to be output in the middle of the job or at the interval between the jobs exists. Specifically, when the machine setting is stored in the nonvolatile memory 12 in referring to the nonvolatile memory 12, it is determined that the machine setting exists. When it is determined that the machine setting exists (YES in Step S102), the flow goes to Step S103. On the other hand, when it is determined that the machine setting does not exist (Step S102: NO), the flow goes to Step S104.

In Step S103, the job output list (second output list L2) in which the machine setting is reflected in addition to the first output list L1 created in Step S101. Specifically, the setting information on the job setting is obtained from the RAM 112, the setting information on the machine setting is obtained from the nonvolatile memory 12, and the second output list L2 is created by arraying the pieces of setting information in the output order according to the items defining the output conditions of each sheet.

The second output list L2 created in Step S103 is stored in the RAM 113.

In Step S104, it is determined whether or not the user provides the preview instruction. When it is determined that the user provides the preview instruction (Step S104: YES), the flow goes to Step S105. On the other hand, when it is determined that the user does not provide the preview instruction (Step S104: NO), the preview screen display processing ends.

The sheet number of the sheet to be previewed is obtained in Step S105. In the case of transition (transition from Step S104) associated with the pressing operation of the preview button B3, the number of "1" is obtained as the sheet number because the head sheet is previewed. On the other hand, in the case of transition (transition from Step S108) associated with the instruction to update the sheet number, the sheet number is obtained in response to the update instruction.

In Step S106, the sheet data corresponding to the sheet number obtained in Step S105 is obtained from the second output list L2 created in Step S103. For example, when the obtained sheet number is "1", the sheet data of the sheet node in which "1" is set to the sheet number C11 of the second output list L2 is obtained. However, when the machine setting does not exist, because the second output list L2 is not created (Step S102: NO), the sheet data is obtained from the first output list L1 created in Step S101.

In Step S107, the displaying section 31 displays the preview screen G7 based on the sheet data obtained in Step S106. Specifically, the document image to be printed on the sheet is calculated from the obtained sheet data, the preview image is produced by executing various pieces of extension processing to the document image stored in the compression memory 16A, and the displaying section 31 displays the preview image.

In Step S108, it is determined whether or not the user provides the instruction to update the sheet number. When it is determined that the user provides the instruction to update the sheet number (Step S108: YES), the flow goes to Step S105. On the other hand, when it is determined that the user does not provide the instruction to update the sheet number (Step S108: NO), the preview screen display processing ends.

Thus, the image controlling section 11 of the image forming apparatus 1 according to the embodiment obtains the output content confirmation information (second output list L2) from the RAM 113 based on the informing instruction (preview instruction) input by the predetermined operation of the operation section 30 by the user. Then, the image controlling section 11 causes the displaying section 31 to display the content confirmation screen (preview screen G7) for the scheduled output contents of the image output operation corresponding to the print job and the predetermined output operation set in the image forming apparatus 1 based on the second output list L2.

Therefore, the user visually recognizes the content confirmation screen for the scheduled output contents of the predetermined output operation set in the image forming apparatus 1, and thereby the user can previously confirm the scheduled output contents.

As a result, for example, even if setting contents for the partition sheet insertion are changed or mistakenly set, the setting contents can be corrected before print outputting, and the correction in the subsequent process can be eliminated.

Figure 13A:
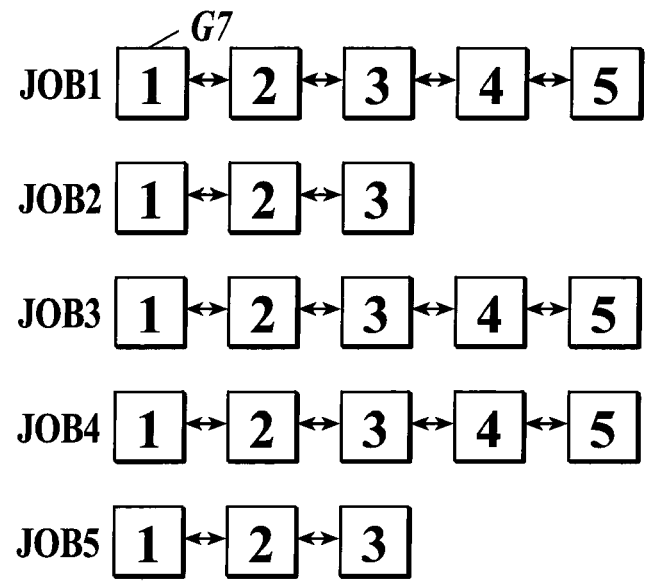
FIG. 13A is a view showing an example of display transition of a preview screen in a conventional image forming apparatus which does not reflect machine setting in the preview.
Figure 13B:
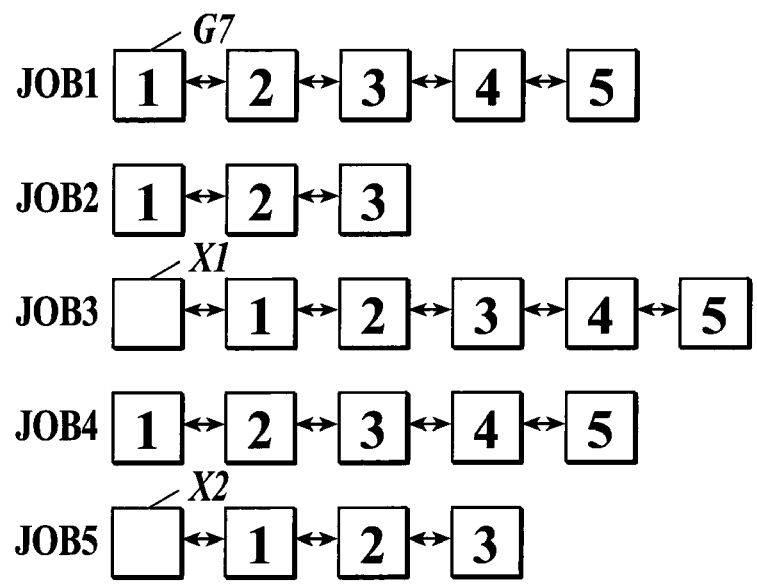
FIG. 13B is a view showing an example of display transition of a preview screen G7 in which the machine setting is reflected in the image forming apparatus 1 according to the embodiment.

Here, an example of display transition of the preview screen G7, in which the machine setting is reflected, to be performed in the image forming apparatus 1 according to the embodiment will be described with reference to FIGS. 13A and 13B. FIGS. 13A and 13B illustrate the cases in each of which "setting for inserting the partition sheet in each two jobs" is set as the machine setting by way of example.

FIG. 13A is a view showing an example of display transition in a conventional image forming apparatus in which the machine setting is not reflected. FIG. 13B is a view showing an example of the display transition in the image forming apparatus according to the embodiment.

Incidentally, in FIGS. 13A and 13B, JOB1 is a setting in which one copy of the print data having the five output pages is output, JOB2 is a setting in which one copy of the print data having the three output pages is output, JOB3 is a setting in which one copy of the print data having the five output pages is output, JOB4 is a setting in which one copy of the print data having the five output pages is output, and JOB5 is a setting in which one copy of the print data having the three output pages is output.

In FIGS. 13A and 13B, the preview screens G7 which respectively correspond to the output sheets of the jobs are arrayed in the output order from the left. The numerical value in the preview screen G7 indicates the sheet number of the sheet displayed in the preview display area E18.

As illustrated in FIG. 13A, in the conventional image forming apparatus, only the preview screen G7 in which the job setting is reflected is displayed because the machine setting cannot be reflected in the preview screen G7.

On the other hand, in the image forming apparatus according to the embodiment, as illustrated in FIG. 13B, the preview screens G7 of the white sheets indicating the partition sheets are displayed in the head (X1 of FIG. 13B) of JOB3 and the head (X2 of FIG. 13B) of JOB5. Thus, the image forming apparatus according to the embodiment can display the preview screen G7 in which the machine setting is reflected.

(Variation 1)

Figure 14:
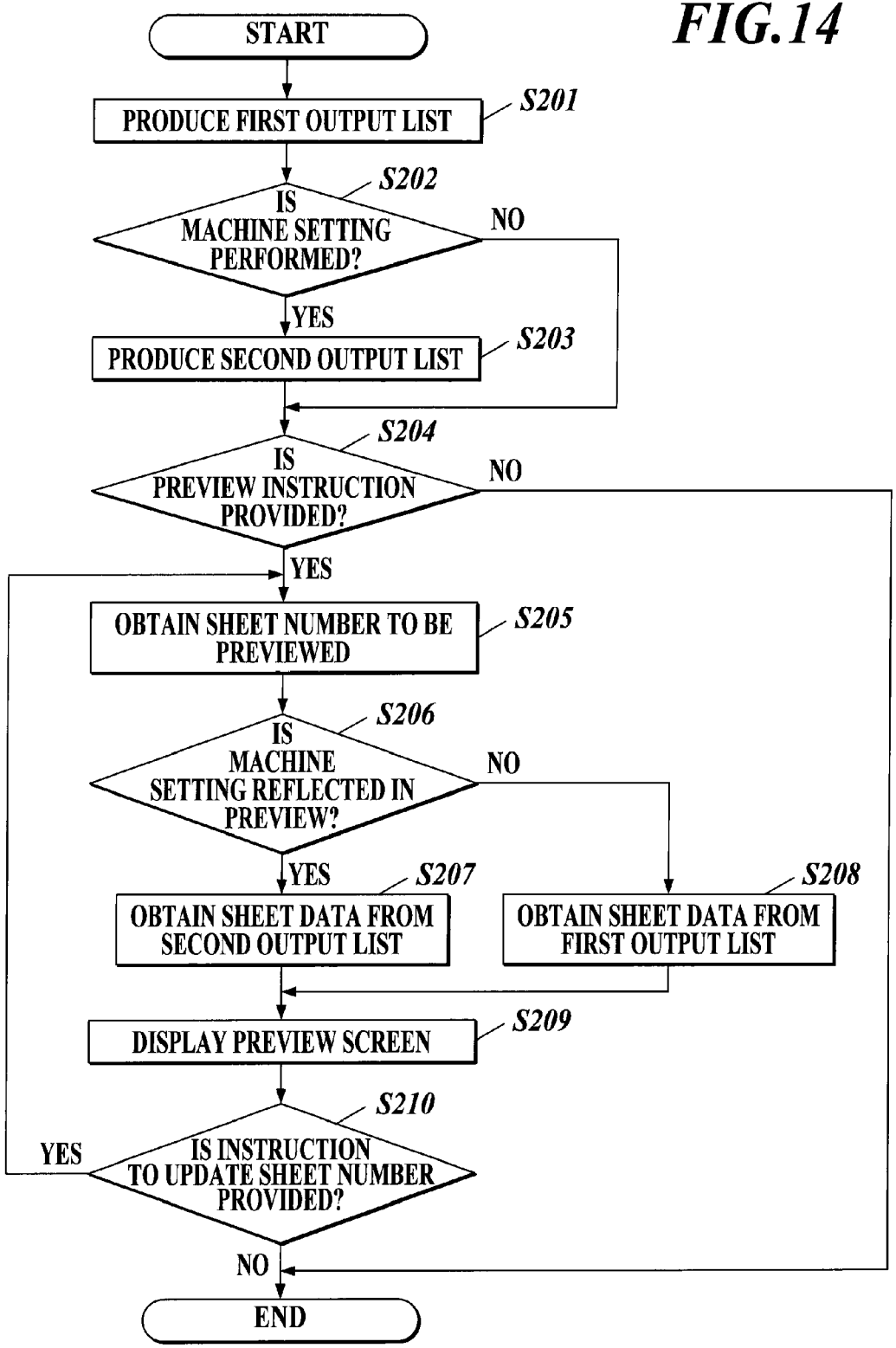
FIG. 14 is a flowchart showing an example of a preview screen display processing executed in an image forming apparatus 1 according to Variation 1.

FIG. 14 is a flowchart showing an example of the preview screen display processing executed in an image forming apparatus 1 according to Variation 1. Variation 1 differs from the embodiment in that the user can select whether or not the machine setting is reflected in the preview.

As illustrated in FIG. 14, because Steps S201 to S205 are similar to Steps S101 to S105 of FIG. 12, the descriptions will not be repeated.

In Step S206, it is determined whether or not the machine setting is reflected in the preview. Specifically, when the pressing operation of the machine setting ON button B31 by the user is detected, it is determined that the machine setting is to be reflected in the preview, and when the pressing operation of the machine setting OFF button B32 by the user is detected, it is determined that the machine setting is not to be reflected in the preview. When it is determined that the machine setting is to be reflected in the preview (Step S206: YES), the flow goes to Step S207. When it is determined that the machine setting is not to be reflected in the preview (Step S206: NO), the flow goes to Step S208.

In Step S207, the sheet data corresponding to the sheet number obtained in Step S205 is obtained from the second output list L2 created in Step S203.

In Step S208, the sheet data corresponding to the sheet number obtained in Step S205 is obtained from the first output list L1 created in Step S201.

In Step S209, the displaying section 31 displays the preview screen G7 based on the sheet data obtained in Step S207 or S208.

In other words, when the second output list L2 is obtained in Step S207, similarly to the above embodiment, the preview image is produced based on the sheet data obtained from the second output list L2, and the displaying section 31 displays the preview image. On the other hand, when the first output list L1 is obtained in Step S208, the preview image is produced based on the sheet data obtained from the first output list L1, and the displaying section 31 displays the preview image.

In Step S210, it is determined whether or not the user provides the instruction to update the sheet number. When it is determined that the user provides the instruction to update the sheet number (Step S210: YES), the flow goes to Step S205. On the other hand, when it is determined that the user does not provide the instruction to update the sheet number (Step S210: NO), the preview screen display processing ends.

Thus, the image controlling section 11 determines whether or not the informing instruction is provided based on the predetermined operation of the operation section 30 by the user. Specifically, when the pressing operation of the machine setting ON button B31 by the user is detected, it is determined that the informing instruction is provided, and when the pressing operation of the machine setting OFF button B32 by the user is detected, it is determined that the informing instruction is not provided.

When it is determined that the informing instruction is provided, the image controlling section 11 causes the displaying section 31 to display the content confirmation screen (preview screen G7) for the scheduled output contents of only the image output operation corresponding to the print job.

Therefore, the user freely selects whether or not displaying the content confirmation screen (preview screen G7) for the scheduled output contents relating to the predetermined output operation (machine setting) set in the image forming apparatus 1, so that improvement of the usability can be expected.

(Variation 2)

Figure 15:
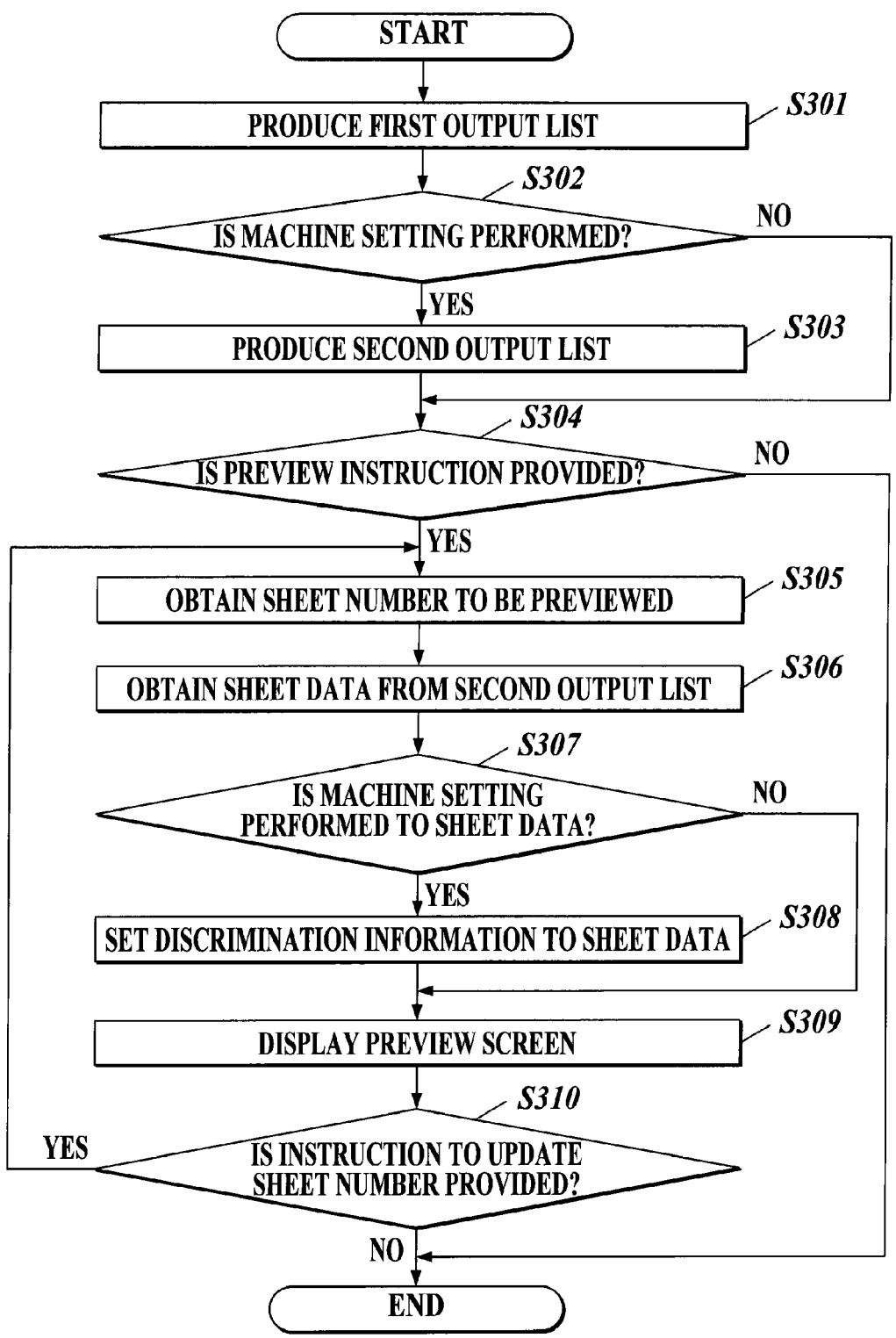
FIG. 15 is a flowchart showing an example of a preview screen display processing executed in an image forming apparatus 1 according to Variation 2.

FIG. 15 is a flowchart showing an example of the preview screen display processing executed in an image forming apparatus 1 according to Variation 2. Variation 2 differs from the above embodiment in that the preview of the sheet (special sheet) to which the machine setting is set is displayed in a discriminable manner.

As illustrated in FIG. 15, because Steps S301 to S306 are similar to Steps S101 to S106 of FIG. 12, the descriptions will not be repeated.

In Step S307, it is determined whether or not the machine setting is set to the sheet data obtained in Step S306. Specifically, when the "special sheet" is set to the ordinary sheet/special sheet C18 of the obtained sheet data (sheet node), it is determined that the machine setting is set to the sheet data. When it is determined that the machine setting is set to the sheet data (Step S307: YES), the flow goes to Step S308. On the other hand, when it is determined that the machine setting is not set to the sheet data (Step S307: NO), the flow goes to Step S309.

In Step S308, information (discrimination information) is set to the sheet data obtained in Step S306. The discrimination information is for displaying the sheet data obtained in Step S306 so as to be discriminable from the sheet data to which the machine setting is not set. As the discrimination information, information for coloring a background, information for performing text display, information for enlarging and reducing the display size, and so on may be cited.

In Step S309, the displaying section 31 displays the preview screen G7 based on the sheet data obtained in Step S306. When the discrimination information is set to the sheet data (transition from Step S308), the displaying section 31 displays the preview screen G7 based on the sheet data to which the discrimination information is set.

In Step S310, it is determined whether or not the user provides the instruction to update the sheet number. When it is determined that the instruction to update the sheet number is provided (Step S310: YES), the flow goes to Step S305. On the other hand, when it is determined that the instruction to update the sheet number is not provided (Step S310: NO), the preview screen display processing ends.

Thus, the image controlling section 11 causes the displaying section 31 to display, in the content confirmation screen (preview screen G7), the one or more scheduled output contents of the image output operation corresponding to the print job, and the one or more scheduled output contents of the predetermined output operation set in the image forming apparatus 1, in a manner enabling discrimination between them.

Therefore, for example, even if both the partition sheet and the slip sheet are displayed as white sheets in the preview screen G7, since the sheet (partition sheet) to which the machine setting is set and another sheet (slip sheet) are discriminably displayed, the user can confirm the output contents while not confusing the partition sheet with the slip sheet.

Figure 16A:
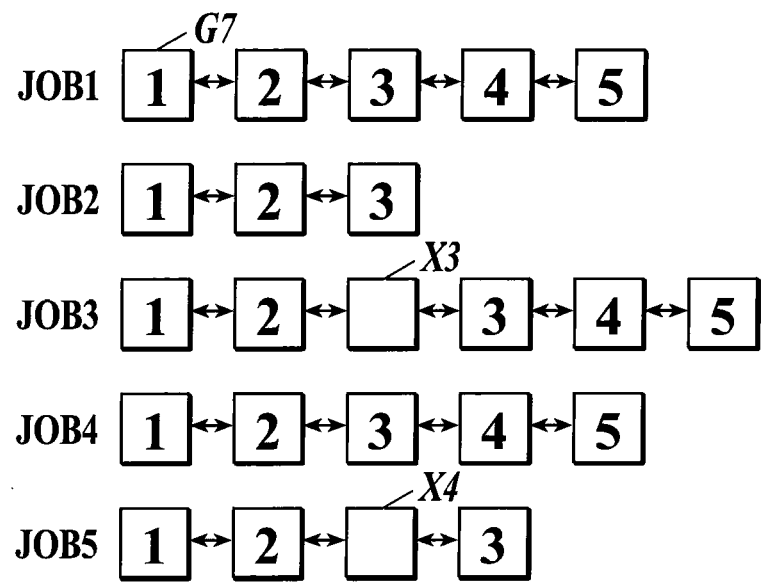
FIG. 16A is a view showing an example of display transition of the preview screen in the conventional image forming apparatus which does not reflect the machine setting in the preview.
Figure 16B:
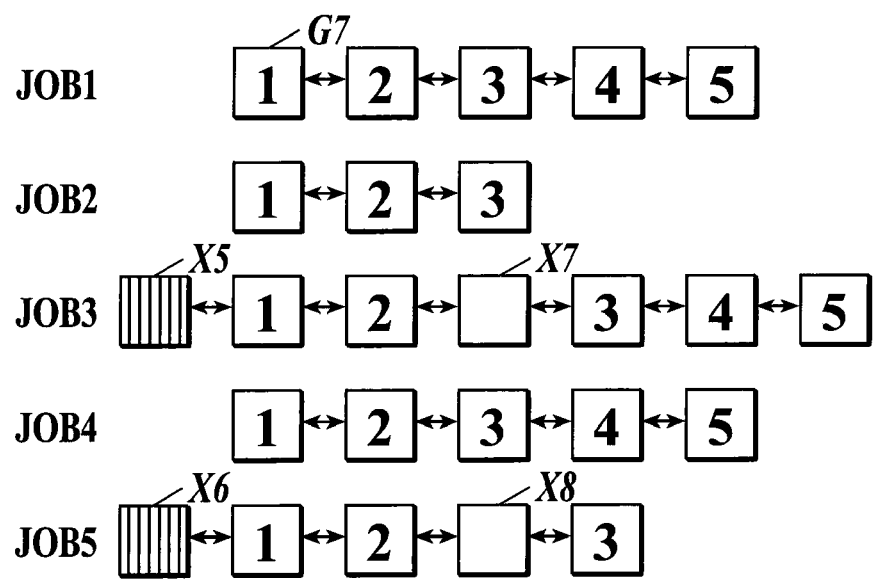
FIG. 16B is a view showing an example of display transition of the preview screen G7 in which a partition sheet is discriminably displayed in the image forming apparatus 1 according to Variation 2.

Here, an example of display transition of the preview screen G7 in which the machine-setting-set sheet is discriminably displayed in the image forming apparatus 1 according to Variation 2 will be described with reference to FIGS. 16 to 18. FIGS. 16A and 16B illustrate the cases in each of which "setting for inserting the partition sheet in each two jobs" is set as the machine setting by way of example.

FIG. 16A is a view showing an example of display transition in the conventional image forming apparatus in which the machine setting is not reflected in the preview. FIG. 16B is a view showing an example of display transition in the image forming apparatus 1 according to Variation 2. In FIGS. 16A and 16B, JOB1 is a setting in which one copy of the print data having the five output pages is output, JOB2 is a setting in which one copy of the print data having the three output pages is output, JOB3 is a setting in which one copy of the print data having the five output pages is output, JOB4 is a setting in which one copy of the print data having the five output pages is output, JOB5 is a setting in which one copy of the print data having the three output pages is output, and each of JOB3 and JOB5 is a setting by which the white slip sheet is inserted after the second page is output.

In FIGS. 16A and 16B, similarly to FIGS. 13A and 13B, the preview screens G7 are arrayed in the output order from the left.

As illustrated in FIG. 16A, in the conventional image forming apparatus, the white preview screens G7 indicating the slip sheets are showed after the second page of JOB3 (X3 of FIG. 16A) and the second page of JOB5 (X4 of FIG. 16A). In other words, the conventional image forming apparatus can display the preview screen G7 in which the job setting such as the slip sheet insertion is reflected.

On the other hand, in the image forming apparatus according to Variation 2, as illustrated in FIG. 16B, the preview screens G7 of the partition sheets are displayed in the head (X5 of FIG. 16B) of JOB5 and the head (X6 of FIG. 16B) of JOB5. In this case, if the partition sheet is displayed as the white sheet for example, the partition sheet can not discriminated from the slip sheet which is similarly displayed as the white sheet (X7 and X8 in FIG. 17B), and this is inconvenient. As illustrated in FIG. 16B, by configuring the image forming apparatus according to Variation 2 such that the machine-setting-set sheet and another sheet are discriminably displayed, the user can recognize that the machine-setting-set sheet differs from another sheet, and the user hardly confuses the partition sheet with the slip sheet.

Figure 17A:
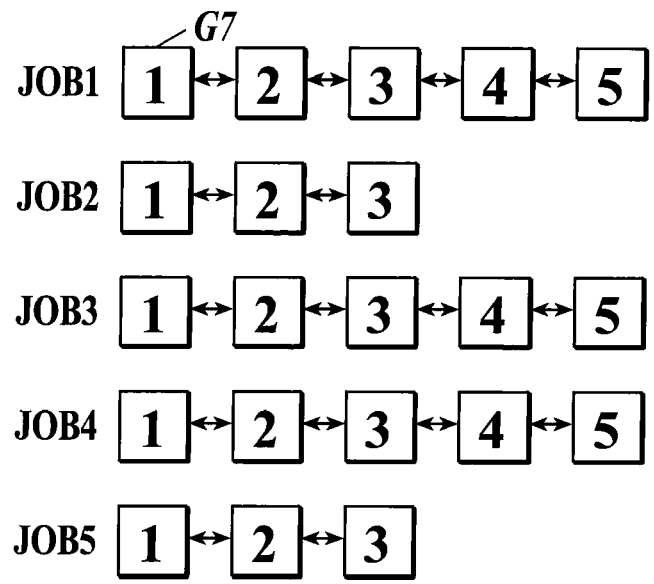
FIG. 17A is a view showing an example of display transition of the preview screen in the conventional image forming apparatus which does not reflect the machine setting in the preview.
Figure 17B:
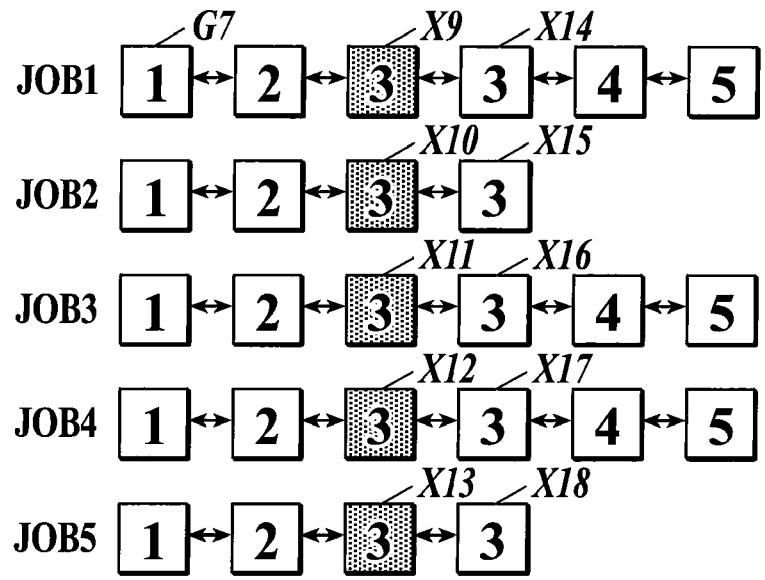
FIG. 17B is a view showing an example of display transition of the preview screen G7 in which a sample sheet is discriminably displayed in the image forming apparatus 1 according to Variation 2.

FIGS. 17A and 17B illustrate the case in which "setting for discharging the sample sheet in the third sheet of one copy" is set as the machine setting by way of example.

FIG. 17A is a view showing an example of display transition in the conventional image forming apparatus in which the machine setting is not reflected in the preview. FIG. 17B is a view showing an example of display transition in the image forming apparatus according to Variation 2. In FIGS. 17A and 17B, JOB1 to JOB5 are set similarly to FIGS. 13A and 13B, and the preview screens G7 are arrayed in the output order from the left.

As illustrated in FIG. 17A, in the conventional image forming apparatus, only the preview screen G7 in which the job setting is reflected is displayed because the machine setting cannot be reflected in the preview screen G7.

On the other hand, in the image forming apparatus according to Variation 2, as illustrated in FIG. 17B, the preview screens G7 (identical to that of the third page) of the sample sheets are displayed in the third sheet (X9 to X13 of FIG. 17B) of JOB1 to JOB5. In the case of the sample sheet, the preview screens G7 identical to that of the document output sheets (X14 to X18 of FIG. 17B) are displayed. However, as illustrated in FIG. 16B, the image forming apparatus of Variation 2 can discriminably display the machine-setting-set sheet and another sheet, so that the user hardly confuses the sample sheet with the document output sheet.

FIGS. 18A and 18B illustrate the cases in each of which "setting for discharging the sample sheet in each ten sheets" is set as the machine setting by way of example.

FIG. 18A is a view showing an example of display transition in the conventional image forming apparatus in which the machine setting is not reflected in the preview. FIG. 18B is a view showing an example of display transition in the image forming apparatus of Variation 2. In FIGS. 18A and 18B, JOB1 is a setting in which three copies of the print data having the five output pages are output, JOB2 is a setting in which three copies of the print data having the three output pages are output, JOB3 is a setting in which two copies of the print data having the five output pages are output, JOB4 is a setting in which two copies of the print data having the five output pages are output, and JOB5 is a setting in which two copies of the print data having the three output pages are output.

In FIGS. 18A and 18B, the preview screens G7 are arrayed in the output order from the left similarly to FIGS. 13A and 13B. Because the plural numbers of copies are set to each of the jobs, the preview screens G7 are repeatedly displayed by the number of copies.

As illustrated in FIG. 18A, in the conventional image forming apparatus, only the preview screen G7 in which the job setting is reflected is displayed because the machine setting cannot be reflected in the preview screen G7.

On the other hand, in the image forming apparatus according to Variation 2, as illustrated in FIG. 18B, the preview screens G7 of the sample sheets are shown in each ten sheets (X19 to X23 of FIG. 18B). The image forming apparatus according to Variation 2 can discriminably display the machine-setting-set sheet and another sheet, and thereby the user hardly confuses the sample sheet with the document output sheet.

(Variation 3)

Figure 19A:
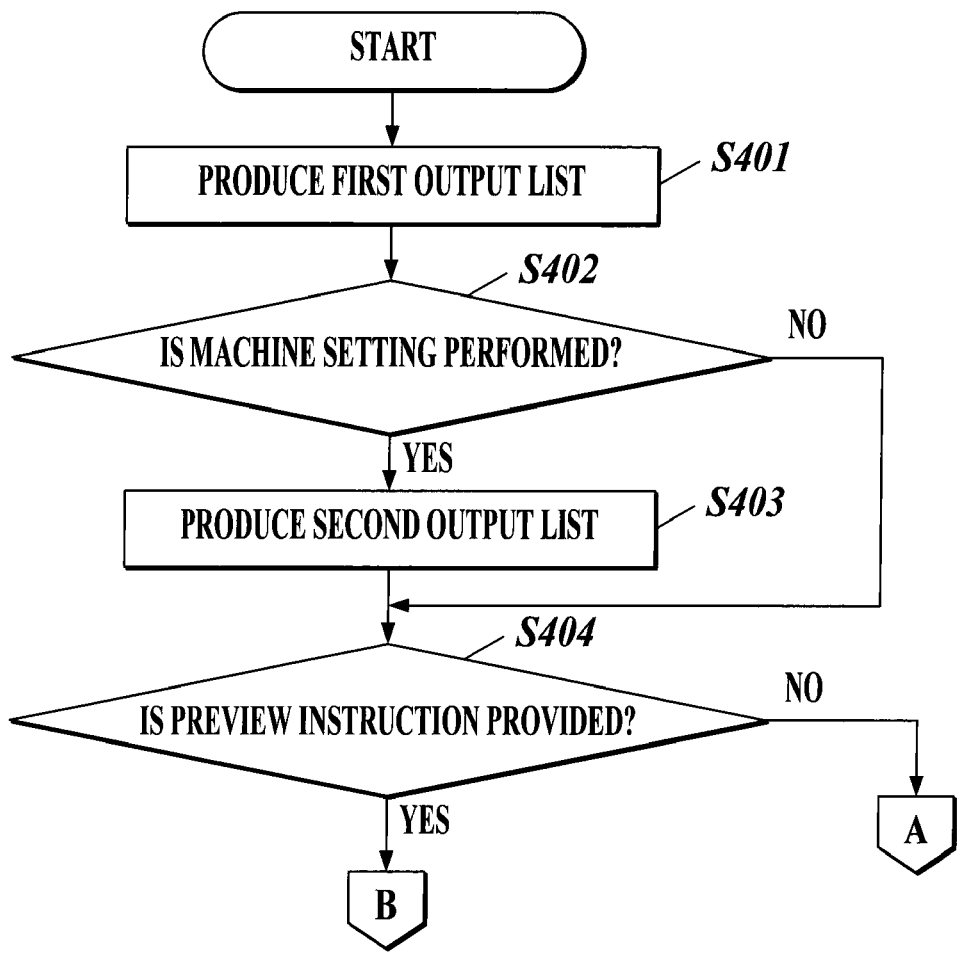

FIG. 19 is a flowchart showing an example of the preview screen display processing executed in an image forming apparatus 1 according to Variation 3. Variation 3 is configured by combining all the above embodiment, Variation 1, and Variation 2.

As illustrated in FIG. 19, because Steps S401 to S408 are similar to Steps S201 to S208 of FIG. 14, the descriptions will not be repeated.

In Step S409, it is determined whether or not the machine setting is set to the sheet data obtained in Step S407 or S408. Specifically, when the "special sheet" is set to the ordinary sheet/special sheet C18 of the obtained sheet data (sheet node), it is determined that the machine setting is set to the sheet data. Alternatively, when it is determined that the machine setting is not reflected in the preview (Step S406: NO), it may be automatically determined that the machine setting is not set to the sheet data. When it is determined that the machine setting is set to the sheet data (Step S409: YES), the flow goes to Step S410. On the other hand, when it is determined that the machine setting is not set to the sheet data (Step S409: NO), the flow goes to Step S411.

Because Steps S410 to S412 are similar to Steps S308 to S310 of FIG. 15, the descriptions will not be repeated.

Thus, also the image forming apparatus 1 according to Variation 3 in which Variations 1 and 2 are combined can achieve the object of the invention, and the user can previously confirm the scheduled output contents relating to the predetermined output operation set in the image forming apparatus 1 similarly to the above embodiment.

The embodiments of the present invention are specifically described above by way of example, but the present invention is not limited to the above, and various changes can be made without departing from the scope of the invention.

For example, though one output sheet is displayed in the preview display area E18 in the above embodiment, all the sheets output by the print jobs may simultaneously be displayed.

In the above embodiment, it is determined whether or not the preview instruction is provided after the output list is created. Alternatively, it is possible to determine whether or not the preview instruction is provided first, and then the output list may be created when it is determined that the preview instruction is provided is made.

In the above embodiment, the displaying section 31 is used as the informing section of the output content confirmation information by way of example. However, the image forming apparatus of the invention is not limited to the displaying section 31. For example, the informing section may be configured to include a data production section which produces sound data based on the output content confirmation information and a sound output section such as a speaker, and the sound output section may provide guidance of the sound data relating to the output content confirmation information.

In the above embodiment, the displaying section 31 displays the preview screen by way of example. Alternatively, for example, the displaying section of the external device 2 may be caused to display the preview screen.

In the above embodiment, inputting and setting of the machine setting are performed by the image forming apparatus 1 by way of example. Alternatively, for example, the input and setting of the machine setting may be performed by the external device 2. Even in this case, the displaying section 31 of the image forming apparatus 1 or the displaying section of the external device 2 may display the preview screen.

The determination whether or not the output order in each predetermined output unit of the scheduled output contents of the image output operation corresponding to the print job in the second output list and the predetermined output operation set in the image forming apparatus 1 is changed may be made after the output content confirmation information (second output list L2) is produced.

In other words, when it is determined that the output order is changed, the image controlling section 11 arrays the scheduled output contents of the image output operation corresponding to the print job and the predetermined output operation set in the image forming apparatus 1 in each predetermined output unit to reproduce the second output list L2.

Accordingly, when the output order of the scheduled output contents regarding the predetermined output operation set in the image forming apparatus 1 is changed, for example when the first print job whose image output operation is scheduled to be performed prior to the second print job is deleted while displaying the preview screen G7 of the second print job, the contents are arrayed in the changed output order to create the second output list L2 again. Therefore, because the preview screen G7 in which the change of the output order is reflected can be displayed, the user can confirm the latest scheduled output contents, and the generation of the printing error can be prevented.

The detailed configuration and the detailed operation of each section constituting the image forming apparatus 1 can appropriately be changed without departing from the scope of the invention.

According to one aspect of the preferred embodiment of the present invention, there is provided an image forming apparatus which forms an image on a recording medium to output the image based on a print job, the image forming apparatus including: a control section which controls an output operation performed by the image forming apparatus; and an informing section; wherein the control section causes the informing section to inform output content confirmation information for confirming one or more contents each being of an image output operation corresponding to the print job and one or more contents each being of a predetermined output operation set in the image forming apparatus, based on the print job and a setting content of the predetermined output operation set in the image forming apparatus, the setting content being set independently of a setting of the image output operation corresponding to the print job.

Preferably, the control section produces information in which one or more scheduled output contents each relating to the image output operation corresponding to the print job and one or more scheduled output contents each relating to the predetermined output operation set in the image forming apparatus are arrayed in an output order in each predetermined output unit, as the output content confirmation information, based on an information production start instruction which is input based on a predetermined operation of an operation section by a user, and the control section causes the informing section to inform the produced output content confirmation information.

Preferably, the control section determines whether or not the output order in each predetermined output unit of the one or more scheduled output contents each relating to the image output operation corresponding to the print job and the one or more scheduled output contents each relating to the predetermined output operation set in the image forming apparatus is changed after the output content confirmation information is produced, and when it is determined that the output order is changed, the control section arrays the one or more scheduled output contents each relating to the image output operation corresponding to the print job and the one or more scheduled output contents each relating to the predetermined output operation set in the image forming apparatus in each predetermined output unit according to the changed output order to reproduce the output content confirmation information.

Preferably, the image forming apparatus further includes: a storage section, wherein the control section causes the storage section to store the produced output content confirmation information, obtains the output content confirmation information from the storage section based on an informing instruction which is input based on a predetermined operation of the operation section by the user, and causes the informing section to inform the output content confirmation information.

Preferably, the control section causes a displaying section as the informing section to display a content confirmation screen of the one or more scheduled output contents each relating to the image output operation corresponding to the print job and the one or more scheduled output contents each relating to the predetermined output operation set in the image forming apparatus based on the produced output content confirmation information.

Preferably, the control section determines whether or not the informing instruction is input based on the predetermined operation of the operation section by the user, and causes the displaying section to display the content confirmation screen of only the one or more scheduled output contents each relating to the image output operation corresponding to the print job when it is determined that the informing instruction is not input.

Preferably, the control section causes the displaying section to display, in the content confirmation screen, the one or more scheduled output contents each relating to the image output operation corresponding to the print job and the one or more scheduled output contents each relating to the predetermined output operation set in the image forming apparatus in a manner enabling discrimination between the scheduled output contents each relating to the image output operation corresponding to the print job and the scheduled output contents each relating to the predetermined output operation set in the image forming apparatus.

The present U.S. patent application claims a priority under the Paris Convention of Japanese patent application No. 2010-104681 filed on 30 Apr. 2010, in which all contents of this application are disclosed, and which shall be a basis of correction of an incorrect translation.

What is claimed is:

1. An image forming apparatus which forms an image on a recording medium to output the image based on a print job, the image forming apparatus comprising: a control section which controls an output operation performed by the image forming apparatus; and an informing section; wherein the control section causes the informing section to inform output content confirmation information for confirming one or more contents each being of an image output operation corresponding to the print job and one or more contents each being of a predetermined output operation set in the image forming apparatus, based on the print job and a setting content of the predetermined output operation set in the image forming apparatus, the setting content being set independently of a setting of the image output operation corresponding to the print job; wherein the control section produces information in which one or more scheduled output contents each relating to the image output operation corresponding to the print job and one or more scheduled output contents each relating to the predetermined output operation set in the image forming apparatus are arrayed in an output order in each predetermined output unit, as the output content confirmation information, based on an information production start instruction which is input based on a predetermined operation of an operation section by a user, and the control section causes the informing section to inform the produced output content confirmation information.

2. The image forming apparatus of claim 1, wherein the control section determines whether or not the output order in each predetermined output unit of the one or more scheduled output contents each relating to the image output operation corresponding to the print job and the one or more scheduled output contents each relating to the predetermined output operation set in the image forming apparatus is changed after the output content confirmation information is produced, and when it is determined that the output order is changed, the control section arrays the one or more scheduled output contents each relating to the image output operation corresponding to the print job and the one or more scheduled output contents each relating to the predetermined output operation set in the image forming apparatus in each predetermined output unit according to the changed output order to reproduce the output content confirmation information.

3. The image forming apparatus of claim 2, wherein the control section causes a displaying section as the informing section to display a content confirmation screen of the one or more scheduled output contents each relating to the image output operation corresponding to the print job and the one or more scheduled output contents each relating to the predetermined output operation set in the image forming apparatus based on the produced output content confirmation information.

4. The image forming apparatus of claim 3, wherein the control section determines whether or not the informing instruction is input based on the predetermined operation of the operation section by the user, and causes the displaying section to display the content confirmation screen of only the one or more scheduled output contents each relating to the image output operation corresponding to the print job when it is determined that the informing instruction is not input.

5. The image forming apparatus of claim 3, wherein the control section causes the displaying section to display, in the content confirmation screen, the one or more scheduled output contents each relating to the image output operation corresponding to the print job and the one or more scheduled output contents each relating to the predetermined output operation set in the image forming apparatus in a manner enabling discrimination between the scheduled output contents each relating to the image output operation corresponding to the print job and the scheduled output contents each relating to the predetermined output operation set in the image forming apparatus.

6. The image forming apparatus of claim 1, further including: a storage section, wherein the control section causes the storage section to store the produced output content confirmation information, obtains the output content confirmation information from the storage section based on an informing instruction which is input based on a predetermined operation of the operation section by the user, and causes the informing section to inform the output content confirmation information.

* * * * *